United States Patent
Jones

(10) Patent No.: US 7,385,160 B2
(45) Date of Patent: Jun. 10, 2008

(54) FOOD HOLDING CABINET WITH REMOVABLE TRAY COVERS

(75) Inventor: Douglas Scott Jones, New Port Richey, FL (US)

(73) Assignee: Merco/Savory, LLC., Fort Wayne, IN (US)

( * ) Notice: Subject to any disclaimer, the term of this patent is extended or adjusted under 35 U.S.C. 154(b) by 52 days.

(21) Appl. No.: 11/582,029

(22) Filed: Oct. 17, 2006

(65) Prior Publication Data

US 2007/0108178 A1 May 17, 2007

Related U.S. Application Data

(60) Provisional application No. 60/727,343, filed on Oct. 17, 2005.

(51) Int. Cl.
*A47J 36/24* (2006.01)
*A47J 39/02* (2006.01)
*A21B 1/22* (2006.01)

(52) U.S. Cl. .............. 219/386; 219/392; 219/394; 126/333; 126/337 R; 126/339

(58) Field of Classification Search .............. None
See application file for complete search history.

(56) References Cited

U.S. PATENT DOCUMENTS

| | | | | |
|---|---|---|---|---|
| D254,308 S | 2/1980 | Polak et al. | .............. | D15/92 |
| 4,575,164 A | 3/1986 | Pinnow et al. | .............. | 312/350 |
| 4,576,425 A | 3/1986 | Pinnow et al. | .............. | 312/324 |
| 4,832,422 A | 5/1989 | Fortmann | ............ | 312/330 SM |
| 5,058,764 A | 10/1991 | Gaba | .......................... | 220/481 |
| D364,530 S | 11/1995 | Robards, Jr. et al. | ........ | D7/350 |
| 5,724,886 A | 3/1998 | Ewald et al. | ............ | 99/374 |
| 5,783,803 A | 7/1998 | Robards, Jr. | ............ | 219/392 |
| 5,900,173 A * | 5/1999 | Robards, Jr. | ............ | 219/392 |
| 5,947,012 A | 9/1999 | Ewald et al. | ............ | 99/374 |
| 6,116,154 A | 9/2000 | Vaseloff | ............ | 99/483 |
| 6,119,587 A | 9/2000 | Ewald et al. | ............ | 99/374 |
| 6,175,099 B1 * | 1/2001 | Shei et al. | ............ | 219/394 |
| 6,262,394 B1 * | 7/2001 | Shei et al. | ............ | 219/399 |
| 6,412,403 B1 | 7/2002 | Veltrop | ............ | 99/483 |
| 6,637,322 B2 | 10/2003 | Veltrop | ............ | 99/483 |
| 6,878,391 B2 | 4/2005 | Veltrop | ............ | 426/418 |

(Continued)

OTHER PUBLICATIONS

International Search Report and Written Opinion dated Sep. 14, 2007 based on PCT application No. PCT/US06/40411.

*Primary Examiner*—J. Pelham
(74) *Attorney, Agent, or Firm*—Ohlandt, Greeley, Ruggiero & Perle, L.L.P.

(57) ABSTRACT

A food holding cabinet having a housing defining a heating chamber for holding a covered food tray in a tray location has a pair of elongated rigid rods mounted to the housing for suspending a food tray cover thereon in a position above the tray location. A front rod extends across the opening to the heating chamber and supports the front end of the tray cover and a rear rod supports the rear of the cover. When a food tray is inserted into the tray location, it lifts and supports the cover. When the tray is removed, the front rod prevents removal of the cover along with the underlying tray. The front rod is spring-loaded to be pulled away from the housing to facilitate removal of the cover. A tray cover is also provided.

43 Claims, 26 Drawing Sheets

U.S. PATENT DOCUMENTS

| | | | |
|---|---|---|---|
| 6,884,451 B2 | 4/2005 | Veltrop | 426/418 |
| 7,105,779 B2* | 9/2006 | Shei | 219/394 |
| 2001/0007322 A1* | 7/2001 | Shei et al. | 219/385 |
| 2003/0118706 A1 | 6/2003 | Veltrop | 426/418 |
| 2004/0020915 A1 | 2/2004 | Shei | 219/385 |
| 2004/0056761 A1 | 3/2004 | Vaseloff et al. | 340/309.16 |
| 2004/0069155 A1* | 4/2004 | Shei | 99/448 |
| 2005/0216349 A1 | 9/2005 | Vaseloff et al. | 705/15 |

\* cited by examiner

FOOD HOLDING CABINET WITH REMOVABLE TRAY COVERS

CROSS REFERENCE TO RELATED APPLICATION

This application is based on and claims the benefits of Provisional Application Ser. No. 60/727,343, filed Oct. 17, 2005.

BACKGROUND OF THE INVENTION

1. Field of the Invention

The present invention relates to food holding cabinets for holding cooked or partially-cooked food in one or more food trays at an elevated temperature until the food is to be served. More particularly, the present invention relates to improved food holding cabinets and to food tray covers for use in the holding cabinets.

2. Description of Related Art

Food holding cabinets, food trays and tray covers are well known, particularly in the fast food industry. The holding cabinets have heated chambers that hold multiple trays containing various food items at ready-to-serve temperatures for serving on an as needed basis. A widely used system employs a freestanding cover that is placed in the heating chamber of the cabinet and defines a receiving area for receiving a food tray. The food tray is placed in the receiving area until the tray is to be withdrawn from the chamber. The cabinet includes a wire rack for engaging the cover to prevent it from being withdrawn from the chamber along with the food tray. Although the wire rack serves its purpose, it interferes with cleaning the chamber. Also, there is heat loss through the space between the tray top edge and the freestanding cover.

BRIEF SUMMARY OF THE INVENTION

It is an object of the present invention to provide food holding cabinets and tray covers that overcome the aforementioned and other problems.

Another object of this invention is to provide food holding cabinets and food tray covers that allow the tray covers to be suspended above each tray location and allow easy ingress and removal of the trays from the covers and from the cabinet.

Another object of this invention is to provide food holding cabinets that suspend tray covers above their respective underlying food tray locations so that trays that are inserted under the covers can be withdrawn from heating chambers without at the same time also withdrawing the covers.

Another object of this invention is to provide food holding cabinets having means for suspending tray covers, the means being located such that they do not interfere with cleaning of the heating chambers.

Another object of this invention is to provide food holding cabinets and covers that provide closure of, and prevent heat and/or moisture loss from, their underlying food trays.

Another object of this invention is to provide food holding cabinets and covers that allow the covers to rest upon their underlying food trays and maintain food quality over the food holding period.

Yet another object of this invention is to provide a simple structure and way to releasably suspend one or more covers for food trays in food holding cabinets.

Still another object of this invention is to provide a food holding cabinet with supported floating tray covers that are supported from the walls of the cabinet with spring loaded retention.

These and other objects and advantages of the present invention are provided by a food holding cabinet that suspends tray covers above food tray locations until the food trays are introduced into the locations, allows the covers to rest on the trays during the food holding period to maintain the food quality over the food holding period, and allows easy removal of the food trays from the cabinets.

Further, these and other objects, advantages and features of the present invention are provided by a food holding cabinet having a heating chamber for holding a covered food tray therein, comprising: a housing that defines the heating chamber and a heating chamber opening for access to the heating chamber. The heating chamber includes a front portion, a rear portion, at least one tray location for receiving a food tray, and a pair of rigid support structures mounted to the housing for suspending a tray cover in the heating chamber in a position above the at least one tray location. The pair of support structures includes a front support structure positioned adjacent to and extending across the front of the heating chamber opening, such that when a food tray is inserted into the food tray location and under a suspended tray cover, the food tray will engage a bottom portion of the tray cover and lift it upwardly off of the pair of support structures such that the tray cover is supported by the food tray, and such that, as the underlying food tray is removed from the heating chamber, the front support structure engages and prevents the tray cover from being removed from the heating chamber along with the food tray, and the support structures resume suspension of the tray cover.

The or each pair of support structures includes a rear support structure. It can be mounted to the housing so that it extends across the rear portion of the heating chamber. Preferably, the rear support structure is an elongated rigid member, for example, a bar, and it is mounted, preferably fixed, to the rear portion of the heating chamber.

In preferred embodiments of the invention, the or each front support structure preferably is an elongated rigid member, for example, a bar, having opposed end portions mounted to the housing, for example, to the housing front wall, to either side of the heating chamber opening. Preferably, the respective opposed end portions each include a spring and preferably are spring-loadedly mounted to the housing to either side of the heating chamber opening.

In preferred embodiments of the invention, the front support structure is mounted to the housing to allow the front support structure to be temporarily movable away from a first position near the heating chamber opening where the front support structure supports a tray cover to a second position further away from the first position to facilitate removal of the tray cover from the front support structure and from the heating chamber opening.

The front support structure preferably is spring-loadedly mounted to the housing such that it is temporarily movable against a biasing force away from the first position to the second position and by the biasing force back toward the first position. In an embodiment, the front support structure has opposed end portions and a central portion between and communicating with the end portions, at least one opposed end portion having a spring section such that the central portion is movable away from the first position to the second position and back toward the first position. In another embodiment, each of the opposed end portions has a spring section.

In a preferred embodiment, at least one, preferably each, of the respective opposed end portions of the elongated rigid member is spring-loadedly mounted to the housing to allow the at least one spring-loaded end portion and at least an adjacent portion of the elongated rigid member to be moved against the bias of the spring further away from the housing and heating chamber opening, to facilitate removal of a food tray cover from the support structures and the heating chamber opening.

In an embodiment, the elongated rigid bar member support structure has a central portion and opposed end portions that are at an angle to the central portion, the housing has a front wall that defines the heating chamber opening, and the respective opposed end portions are mounted to the housing front wall to either side of the heating chamber opening.

In a preferred embodiment of the invention, the heating chamber is for holding a plurality of covered food trays therein, and the heating chamber includes a plurality of food tray locations, a left tray location, and a right tray location, the left and right tray locations being side-by-side to one another and each for receiving a food tray. In the embodiment, the pair of support structures are for suspending a tray cover above each tray location, such that when a food tray is inserted into a respective food tray location and under a respective suspended tray cover, the food tray will engage a bottom portion of its respective tray cover and lift it upwardly off of the pair of support structures such that the tray cover is supported by its underlying food tray, and such that as the underlying food tray is removed from the heating chamber, the front support structure engages and prevents the tray cover from being removed from the heating chamber along with the food tray, and the support structures resume suspension of the tray cover, and.

In the most preferred embodiments of the invention, the heating chamber is for holding a plurality of covered food trays therein, wherein the heating chamber includes two compartments, an upper compartment and a lower compartment, one being above the other and separated by a floor, the upper compartment including an upper left tray location and an upper right tray location, and the lower compartment including a lower left tray location and an lower right tray location, side-by-side to one another. Each of the four tray locations is for receiving a respective food tray. There are two pairs of support structures, a first upper pair of support structures mounted to the housing to be operative to suspend a food tray cover above each respective upper left and upper right food tray locations, and a second lower pair of support structures mounted to the housing to be operative to suspend a food tray cover above each respective lower left and lower right food tray locations. When a food tray is inserted into a respective food tray location and under a respective suspended tray cover, the food tray will engage a bottom portion of its respective tray cover and lift it upwardly off of the corresponding pair of support structures such that the tray cover is supported by its underlying food tray, and such that as the underlying food tray is removed from the heating chamber, the front support structure of the corresponding pair of support structures engages and prevents the tray cover from being removed from the heating chamber along with the removed food tray, and the corresponding pair of support structures resumes suspension of the tray cover.

In embodiments of the invention, preferably the or each pair of support structures is mounted at positions that will suspend the tray cover or each of the tray covers to be suspended thereon at a height that is slightly less than the height of the respective food tray that is to be seated thereunder in the respective tray location.

In a most preferred embodiment of the invention, each of the two pairs of upper and lower support structures includes a front support structure positioned adjacent to the front portion of the respective upper and lower compartments, and a rear support structure positioned adjacent and preferably fixed to the rear portion of the respective upper and lower compartments, each of the respective upper and lower front support structures extending across and in front of the heating chamber opening to the respective upper and lower compartments.

In the most preferred embodiments of the invention, each front support structure preferably is an elongated rigid member, for example, a bar, having opposed end portions, at least one, preferably each of the respective opposed end portions of the elongated rigid member includes a spring and is spring-loadedly mounted to the housing to allow the at least one spring-loaded end portion and at least an adjacent portion of the elongated rigid member to be moved against the bias of the spring further away from the housing and heating chamber opening, to facilitate removal of the food tray from the support structures and the heating chamber opening.

In embodiments of the invention, preferably the housing includes a rear wall which in part defines the heating chamber, the rear wall being at least partly movable or removable so as to create a heating chamber rear opening.

In the most preferred embodiments of the invention, the front support structure elongated rigid members are mounted to the housing to be temporarily movable away from a first position near the heating chamber opening where the front support structures support one or two tray covers, to a second position further away from the first position, to facilitate removal of either or both of the tray covers from the respective support structures and the heating chamber opening.

In preferred embodiments of the invention the front support structures are spring-loadedly mounted to the housing such that they are temporarily movable against a biasing force away from the first position to the second position and by the biasing force back toward the first position. In an embodiment, the front support structure can have opposed end portions and a central portion between and communicating with the end portions, at least one opposed end section having a spring section such that the central portion is movable away from the first position to the second position and back toward the first position. In another embodiment, each of the opposed end portions has a spring section.

An embodiment of the invention disclosed herein is a food tray cover for covering a food tray for use in a food holding cabinet, which comprises: a recessed top central panel in communication with and surrounded by a pair of opposed upstanding side walls, and by a pair of opposed upstanding front and rear walls that communicate with the pair of front and rear walls. In the embodiment, the front wall extends up higher than the rear wall, the front wall communicates with at least one forwardly extending front extension, and the rear wall communicates with at least one rearwardly extending rear extension. Preferably, each of the at least one front extension and the at least one rear extension is a continuous lip, and preferably the front continuous lip extends further forward than the rear continuous lip extends rearward. The at least one front extension can comprise a plurality of lips and/or a plurality of prongs.

Preferably, the front and rear continuous lips have an undersurface that is substantially flat.

Desirably, the central panel is substantially flat, and the central panel and the walls are substantially flat and substantially rectilinear. Also, desirably the front and rear continuous lips have an undersurface that is substantially flat. Further, one of the side walls communicates with a skirt that depends from the said one side wall to below said recessed central panel, and that can desirably along substantially the entire length of the central panel. Still further, the food tray cover desirably is a one-piece construction of metal or plastic.

Other and further objects, advantages and features of the present invention will be understood by reference to the following:

DETAILED DESCRIPTION OF THE INVENTION

Figure 1:
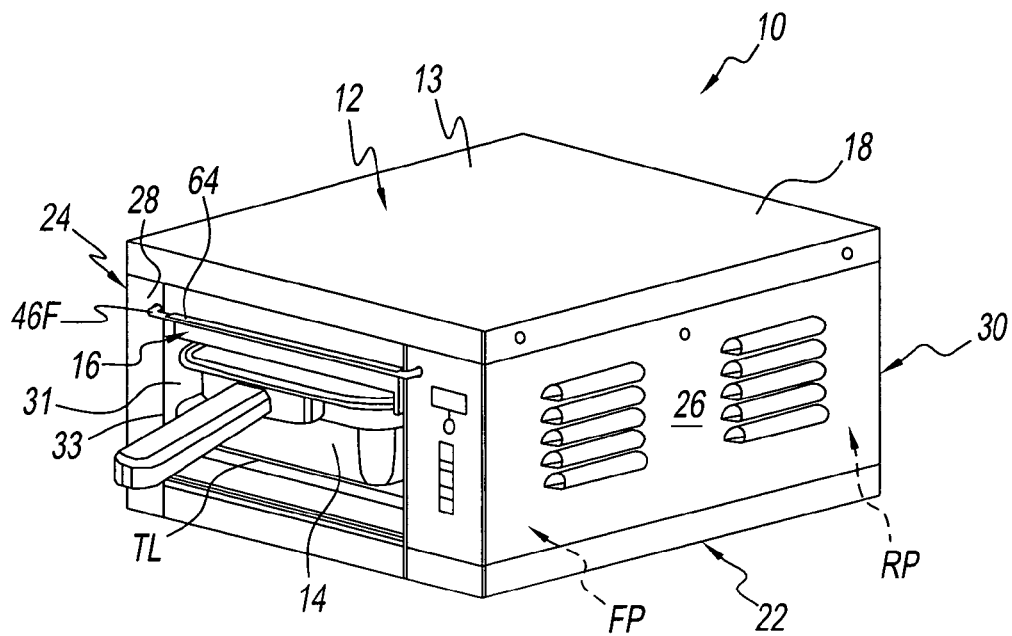
FIG. 1 is a front right side perspective view of a first embodiment of a preferred food holding cabinet of the present invention.
Figure 1A:
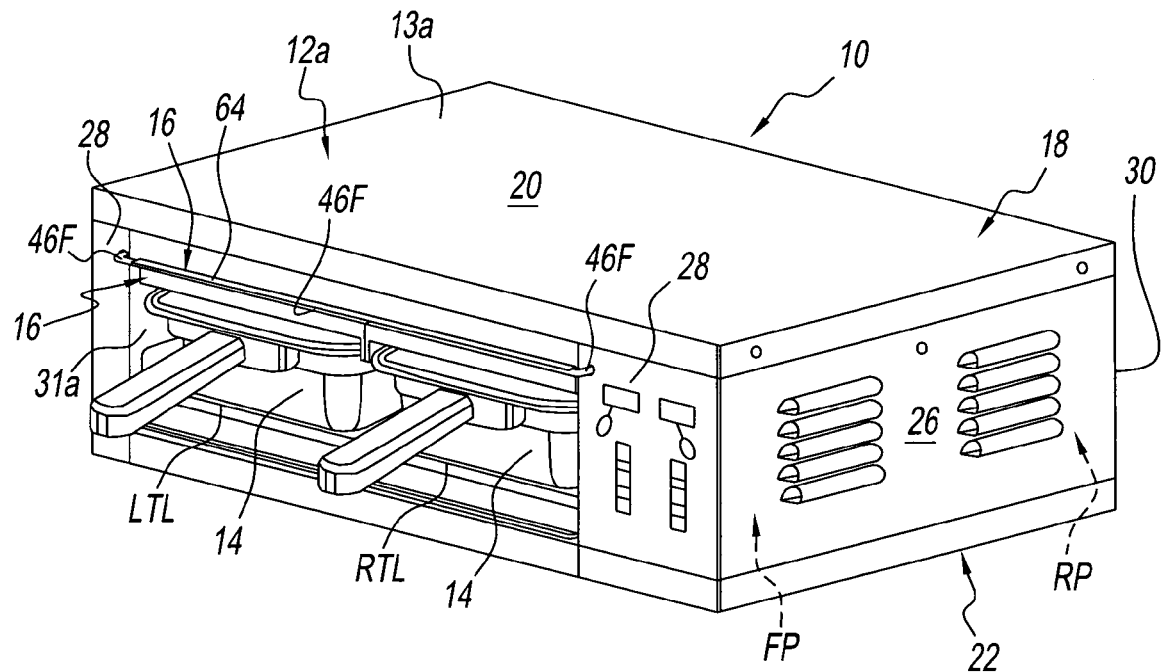
FIG. 1A is a front right side perspective view of a second preferred food holding cabinet of the invention.
Figure 1B:
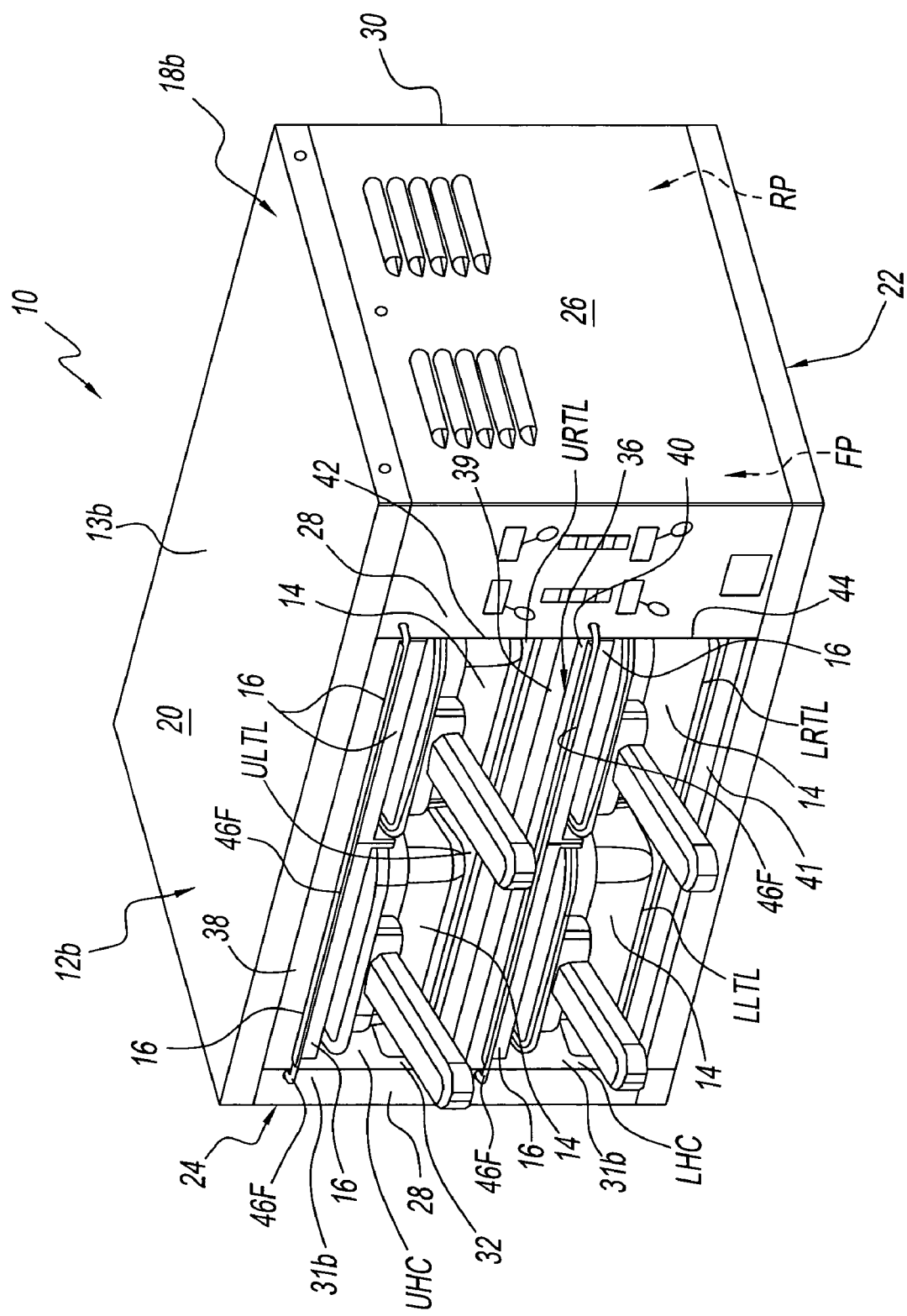
FIG. 1B is a front right side perspective view of a third, most preferred food holding cabinet of the invention.

Referring to FIGS. 1, 1A and 1B, there is shown a food holding cabinet assembly, generally designated 10, comprised of a food holding cabinet 12, one or more food holding trays 14 and one or more tray covers 16. Each food holding cabinet 12 (FIG. 1), 12a (FIG. 1A) and 12b (FIG. 1B) is comprised of a housing 18 having top and bottom walls 20, 22, side walls 24 and 26, and front and rear walls 28, 30. Housing 18 defines a heating chamber 31 and a heating chamber opening 33 for access to heating chamber 31, the heating chamber being for holding a covered food tray therein. Heating chamber 31 includes a front portion FP, a rear portion RP and at least one tray location TL for receiving a food tray 14. Each of FIGS. 1, 1A and 1B shows an embodiment of the food holding cabinet of the invention, FIG. 1 showing a basic embodiment, FIG. 1A a more preferred embodiment and FIG. 1B the most preferred embodiment of the invention.

In accordance with the invention, and preferably including all embodiments, food holding cabinet 12 is also comprised of a pair of rigid support structures 46 mounted to housing 13 for supporting and suspending a tray cover 16 in heating chamber 31 in a position or bin above the at least one tray location TL. The pair of support structures 46 includes a front support structure 46F (shown) positioned adjacent to and extending across the front of heating chamber opening 33, and a rear support structure 46R (not shown) positioned adjacent to and that extends across and is mounted, preferably fixed, to the rear portion RP of housing 13 or of heating chamber 31. Preferably, each of the support structures is an elongated rigid member, for example, a rod or a bar, desirably made of metal or plastic. Preferably, the rigid support structure(s) is or are releasable to facilitate removal of one or more suspended covers 16 from the rigid support(s). As will be explained and shown further, when a food tray 14 is inserted into the food tray location TL and under a suspended tray cover 16, food tray 14 will engage a bottom portion of tray cover 16 and lift it upwardly off of the pair of support structures 46 such that the tray cover 16 is supported by food tray 14, and such that, as the underlying food tray 14 is removed from heating chamber 31, the front support structure 46f engages and prevents tray cover 16 from being removed from heating chamber 31 along with the food tray 14, and the pair of support structures 46 resume support and suspension of tray cover 16. In all embodiments of the invention, preferably, the pair of support members 46 are mounted to housing 13 at positions that will suspend a tray cover 16 thereon at a height that is slightly less than the height of the food tray 14 that is to be seated in the tray location.

FIG. 1A shows a second preferred embodiment of the invention. More particularly, FIG. 1A shows a food holding cabinet 12a whose housing 13a defines a heating chamber 31a for holding a plurality of, here, two, covered food trays 14 at a plurality of food tray locations, a left bin or tray location LTL and a right bin or tray location RTL, the tray locations being side-by-side to one another and each for receiving a food tray 14. The pair of support structures 46 (front one shown) are, and are positioned and function as described in connection with the pair of support structures 46 shown in food holding cabinet 13 of FIG. 1.

FIG. 1B shows a third, most preferred embodiment of the invention. FIG. 1B shows a food holding cabinet 12b whose housing 13b defines a heating chamber 31b for holding a plurality of, here, four, covered food trays 14 at or in a plurality of four bins or food tray locations. Heating chamber 31b includes two parts or compartments, an upper heating chamber or compartment UC or UHC and a lower heating chamber or compartment LC or LHC, one being above the other and separated by a floor F, upper compartment UC including an upper left tray location ULTF and an upper right tray location URTL, and lower compartment LC including a lower left tray location LLTL and a lower right tray location LRTL, side-by-side to one another, each of the four tray locations being for receiving a respective food tray 14. In the embodiment of FIG. 1B, there are two pairs of support structures 46, a first upper pair of support structures 46 mounted to housing 18b to be operative to suspend a food tray cover 16 above each respective upper left tray location ULTL and upper right food tray location URTL, and a second lower pair of support structures 46 mounted to the housing to be operative to suspend a food tray cover above each respective lower left and lower right food tray locations, LLTL and LRTL. Each pair of support structures 46 (front one shown) is, and is positioned and functions, as described in connection with the pair of support structures 46 shown in food holding cabinet 13 of FIG. 1 and of FIG. 1A. Thus, with respect to food holding cabinet 12b of FIG. 1B, each pair 46 of the two pairs of upper and lower support structures includes a front support structure 46F positioned adjacent to the front portion FP of the respective upper and lower compartments, and a rear support structure 46R positioned adjacent to the rear portion RP of the respective upper and lower heating compartments UHC, LHC, here respectively designated (32) and (34), each of the respective upper and lower front support structures extending across and in front of the heating chamber opening 42, 44 to the respective upper and lower compartments.

As shown in FIG. 1B, holding cabinet 12 can be comprised of one or more heating chambers, here shown as upper and lower heating chambers or sections 32, 34 that are vertically separated by an intermediate shelf 36. Each heating chamber is heated by a suitably located heater. For example, upper heating chamber 32 has an upper heater 38 disposed along the ceiling of that chamber, and a lower heater 39 disposed along the top of shelf 36. Lower heating chamber 34 has an upper heater 40 disposed under and along shelf 36, and has a lower heater 41 disposed along the top surface of the bottom wall of cabinet 12b. Each heating chamber part or compartment includes two tray locations, a left tray location LTL and a right tray location RTL. Upper heating chamber 32 portion has a front opening 42 and lower heating chamber 34 has a front opening 44.

Figure 1C:
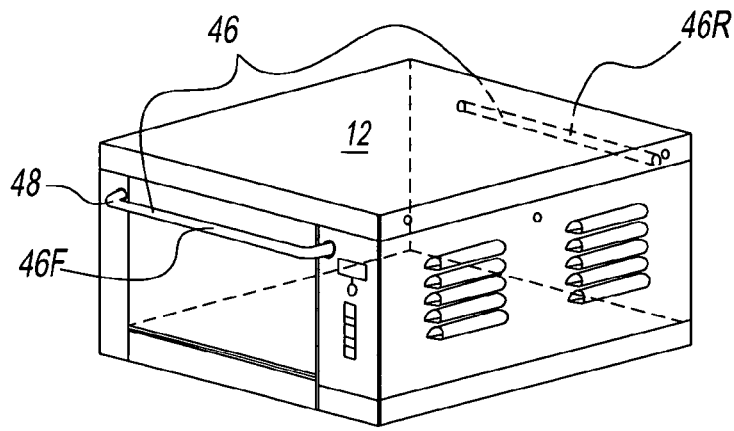
FIGS. 1C and 1D are right side perspective views respectively showing a single pair of front and rear support structures of the respective food holding cabinets of FIGS. 1 and 1A.
Figure 1D:
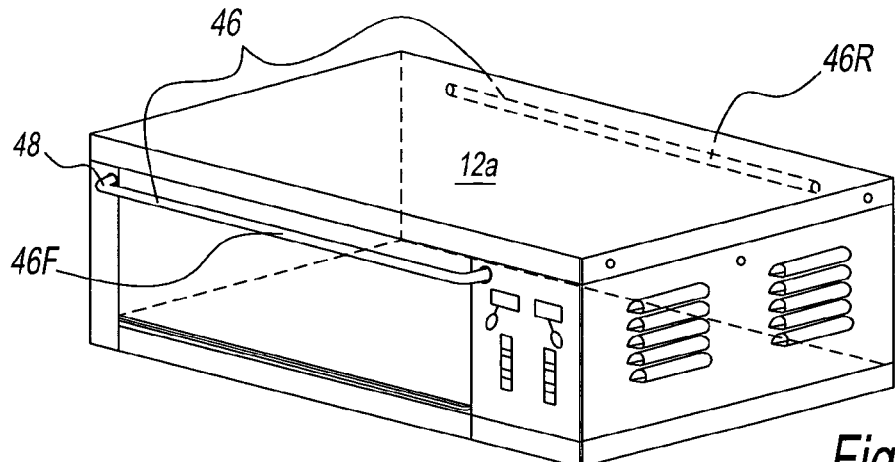
Figure 1E:
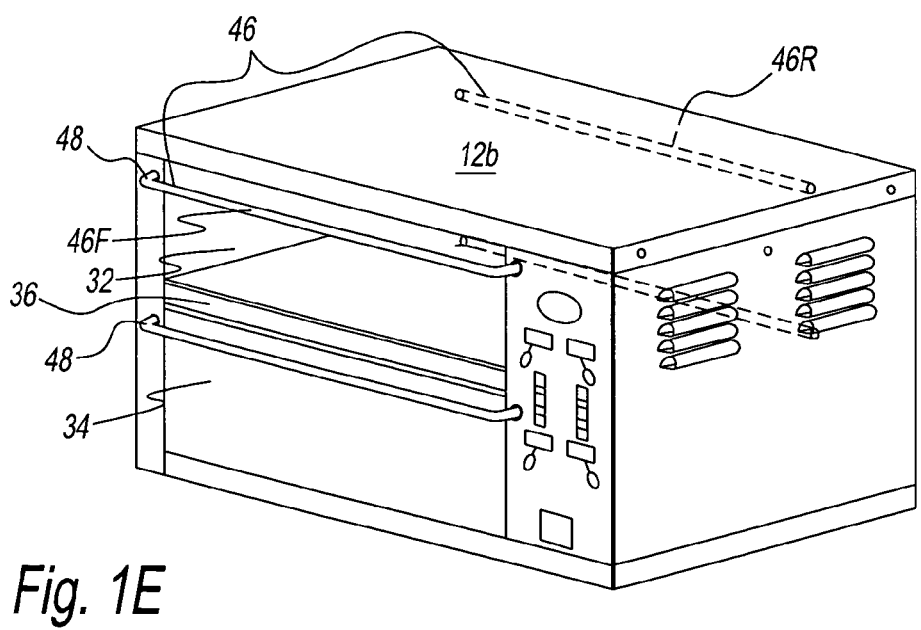
FIG. 1E is a right side perspective view showing two pair of front and rear support structures of the food holding cabinet of FIG. 1B.
Figure 1F:
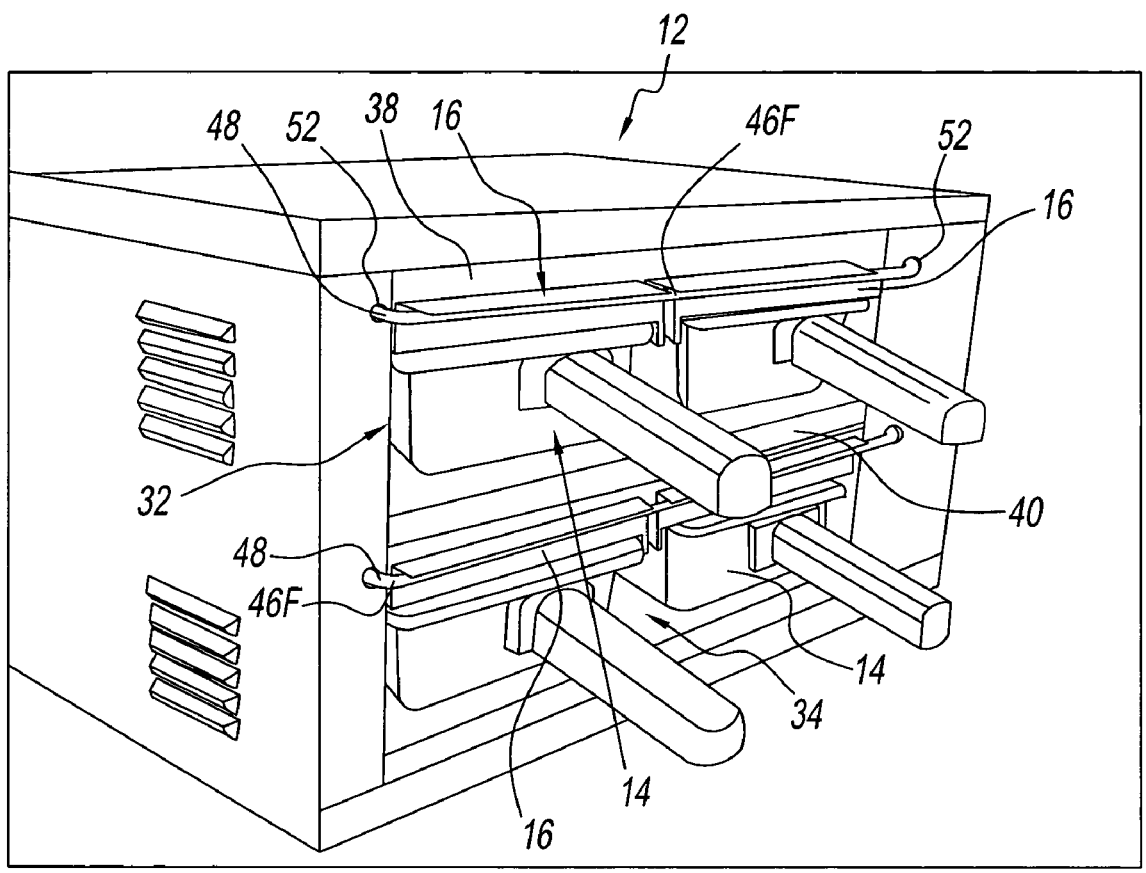
FIG. 1F is a front left side perspective view of the food holding cabinet of FIG. 1B.
Figure 1G:
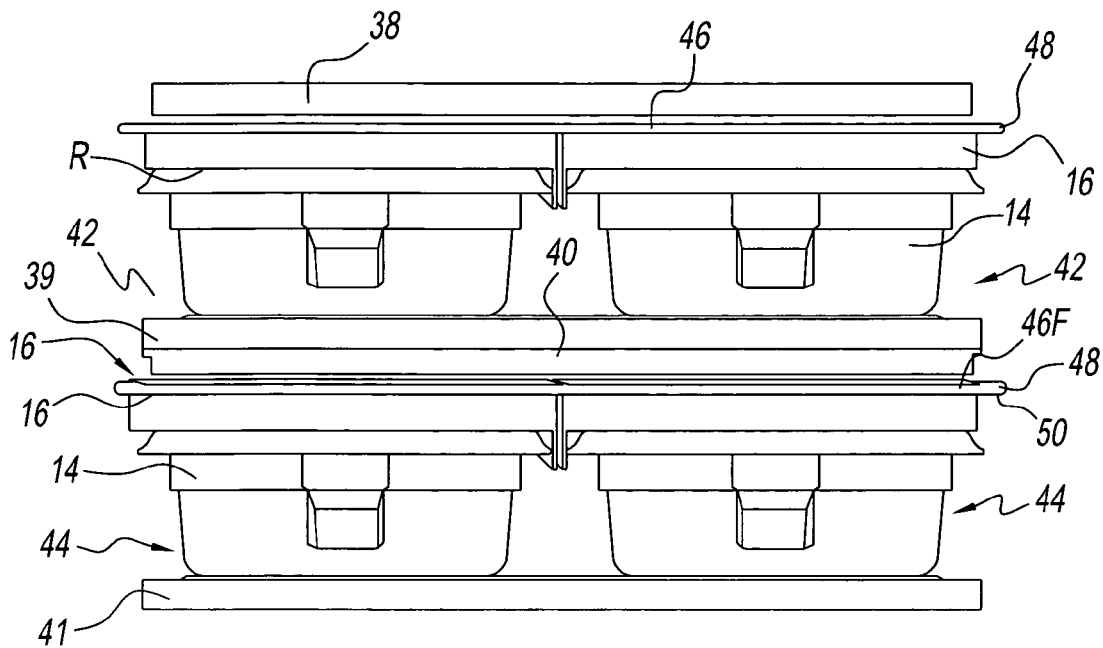
FIG. 1G is a front view with portions removed of the food holding cabinet of FIG. 1B.
Figure 1H:
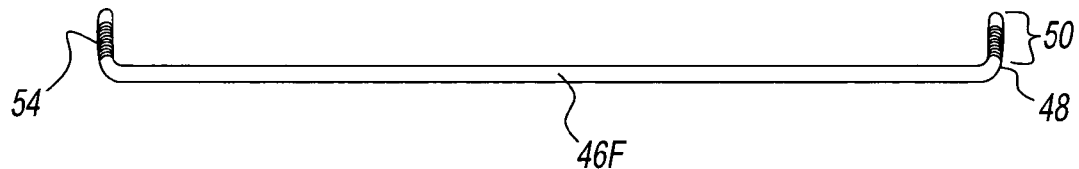
FIG. 1H is a top plan view of a front support bar or rod adapted for spring loaded mounting to a housing for supporting and suspending a food tray according to the present invention.
Figure 1I:
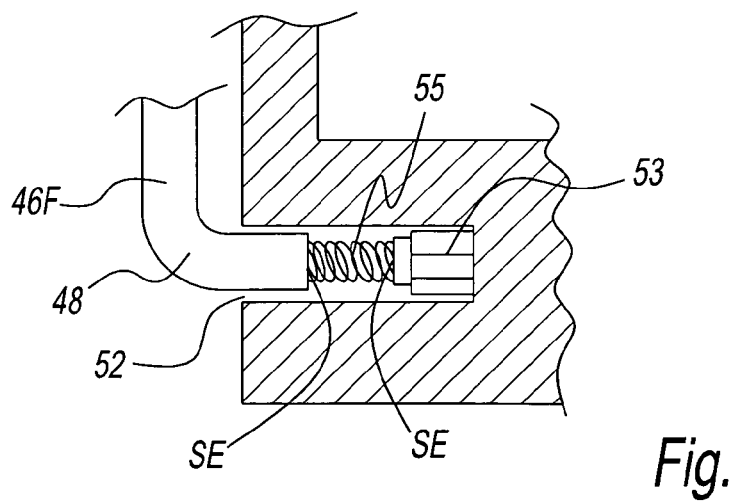
FIG. 1I is a top view partly in plan view and partly in section showing a front support structure having a spring section.
Figure 2:
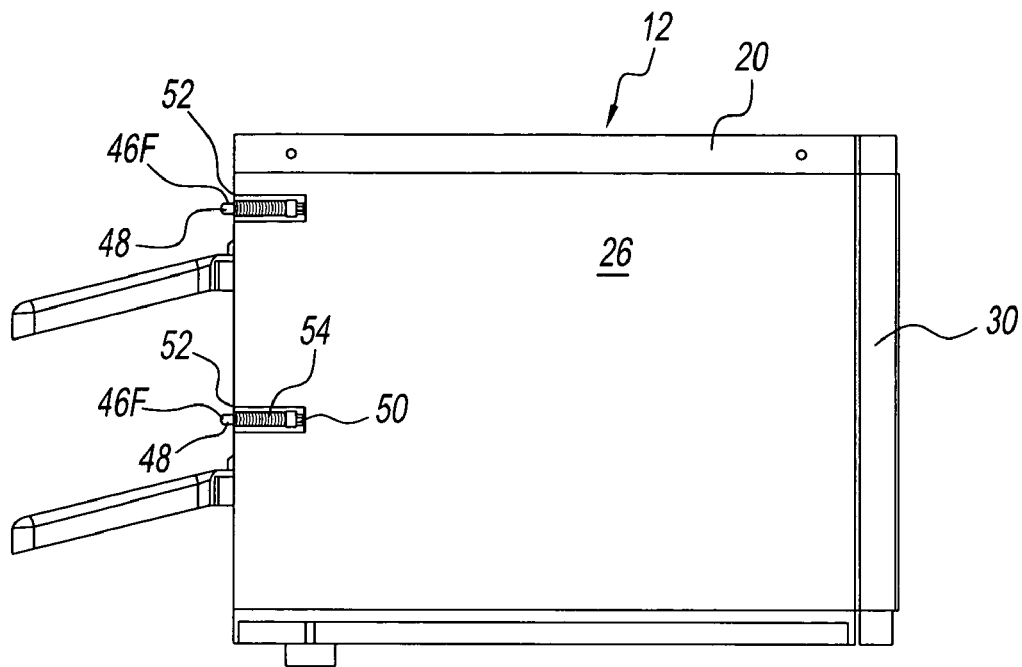
FIG. 2 is a right side view of a food holding cabinet of the invention.
Figure 2A:
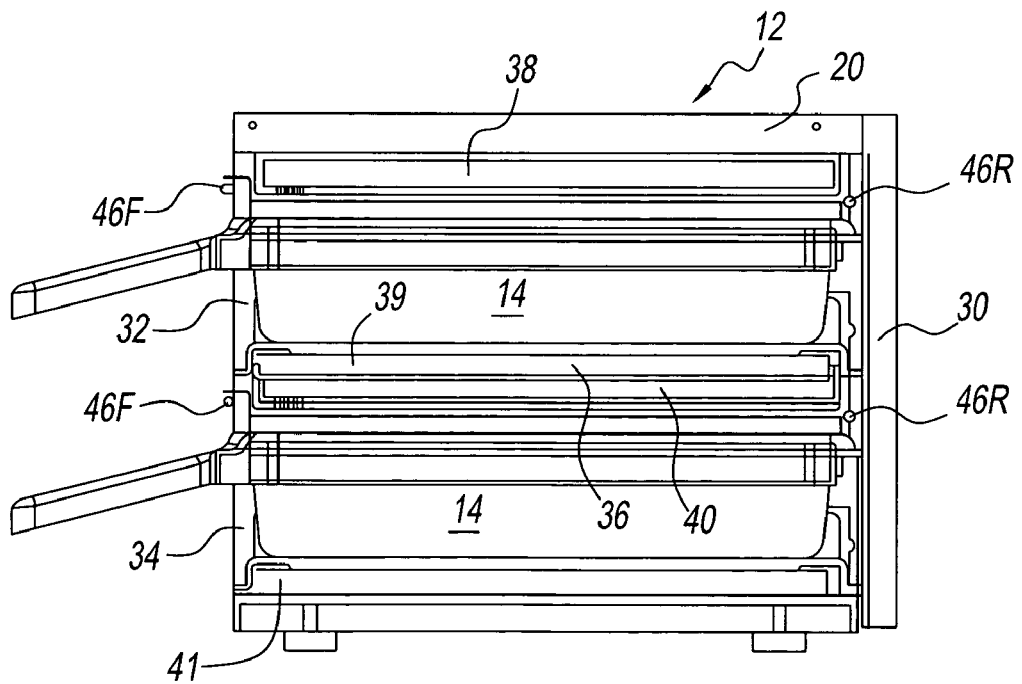
FIGS. 2A and 2B are side views of the holding cabinet of FIG. 2 with its side wall removed and with food trays in place.
Figure 2B:
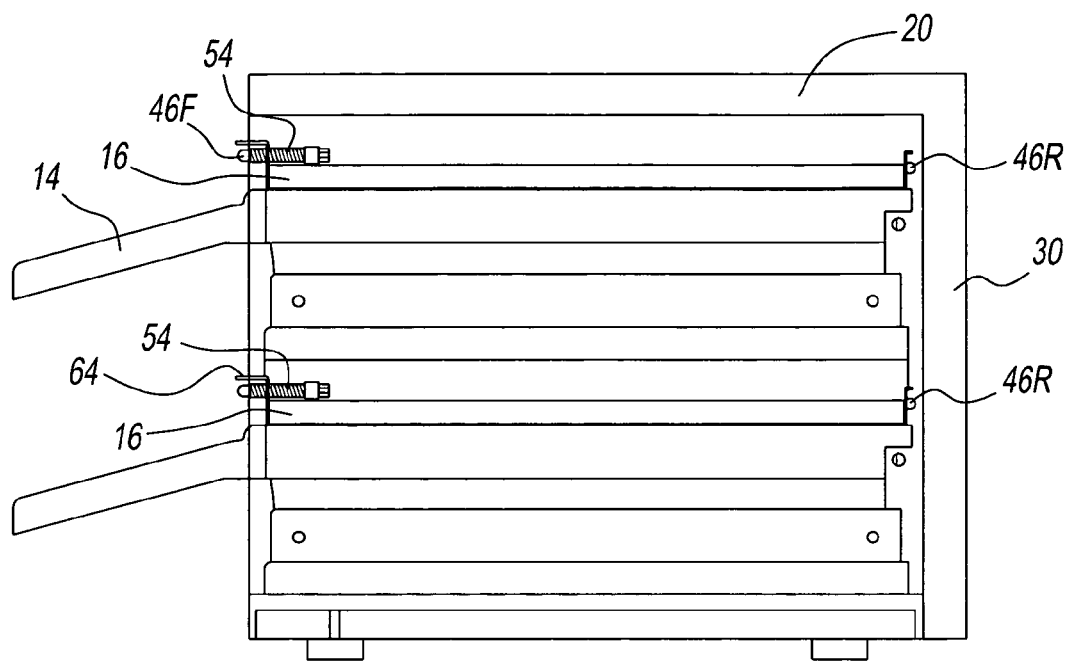
Figure 3:
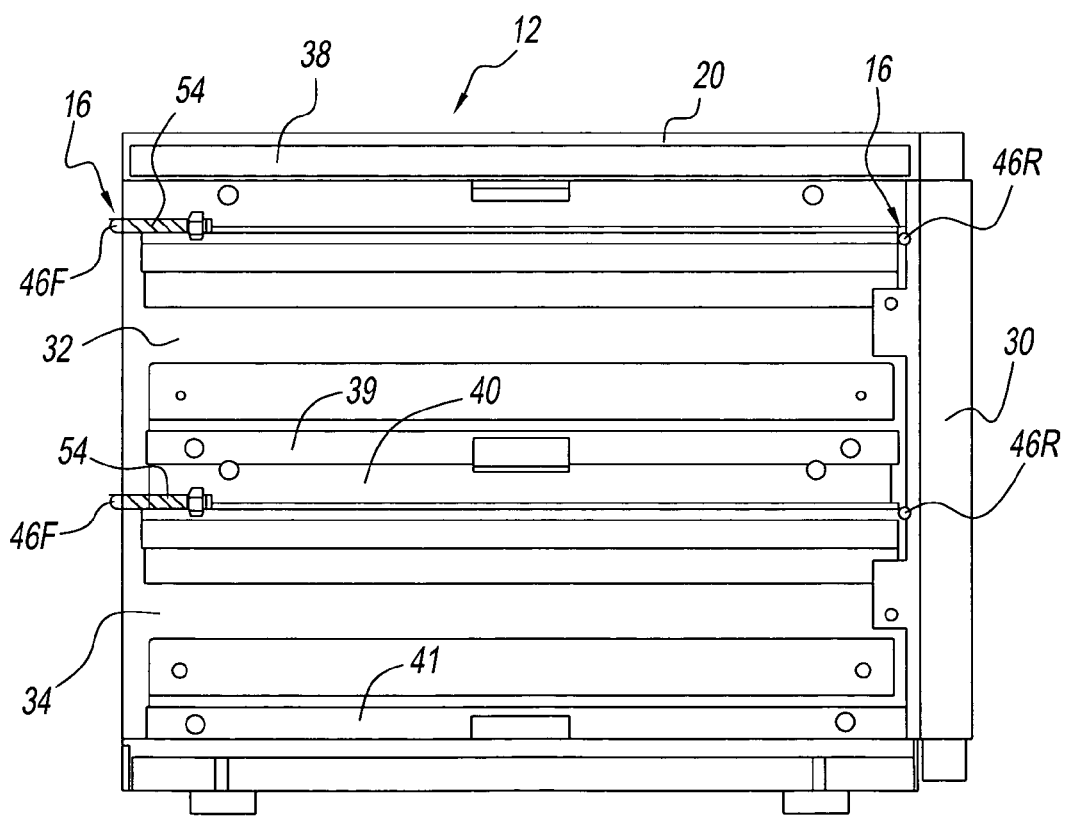
FIG. 3 is a side view of the holding cabinet of FIG. 2B with its food trays removed.

With respect to the pairs of rigid support structures 46 (FIGS. 1C through 1D), preferably they comprise a cooperative pair of elongated rigid members, for example, bars or rods, there being a front support structure 46F and a rear support structure 46R. Support structures 46F, 46R of pair 46 are mounted by suitable structure to holding cabinet 12 or to housing 13 to either side of the pertinent heating chamber opening, e.g., to an adjacent side wall 24, 26 or to front wall 28, such that a front support structure 46F extends across and preferably in front of a portion, preferably an upper portion, of the front opening 42 of a heating chamber, 31b, e.g. upper heating chamber UHC 32, and another rod 46R extends across preferably an upper portion of rear portion RP heating chamber 31b, e.g., upper heating chamber 32. For a holding cabinet 12b having upper and lower heating chambers, parts or compartments, as shown in FIG. 1B, another pair of support structures 46 is similarly employed with respect to lower heating chamber LHC 34. Thus, a front support structure 46F extends across an upper portion of, and preferably in front of, front opening 44 of lower heating chamber LHC 34, and a rear support structure, e.g., a rear rod, 46R, extends across an upper portion of rear opening 42 of lower heating chamber LHC 34. Desirably, rear support structures 46R are fixed to a rear portion of the heating chamber in which they reside.

In embodiments of the invention, desirably front support structures 46F can be mounted to a food holding cabinet, e.g., 12 or housing 13 so that front support structures 46F are temporarily movable away from a first position near and across the heating chamber openings, e.g., 42, 44 where front support structures 46F respectively support one or more tray covers 16, to a second position further away from the first position to facilitate removal of the one or more tray cover(s) 16 from the respective front support structures 46F and from the heating chamber openings. Accordingly, front support structures 46F desirably can be spring mounted or spring-loadedly mounted to cabinet 12 or housing 13 such that it is temporarily movable against a biasing force, e.g., a spring biasing force, away from the first position to the second position and by the biasing force back toward the first position. This is to allow for example, the at least one spring-loaded end portion 50 and at least an adjacent portion of the front elongated rigid member 46F to be moved against the bias of the spring further away from the housing and heating chamber opening, to facilitate removal of a food tray cover from the support structures and a heating chamber opening.

In preferred embodiments of the invention, at least one end or opposed end portion 50, preferably each end or opposed end portion 50, of each front support structure 46F includes a spring and is spring mounted or spring-loadedly mounted to holding cabinet 12 or to housing 13, e.g., to front wall 28 or to either side wall of the housing to either side of the heating chamber opening 42, 44 alongside the respective upper and lower heating chambers UHC (32), LHC (34). This allows the at least one, or each, spring-loaded end portion and at least an adjacent portion of the elongated rigid member to be moved against the bias of the spring further away from the housing and heating chamber opening, to facilitate removal of the food tray from the support structures and the heating chamber opening.

Figure 11:
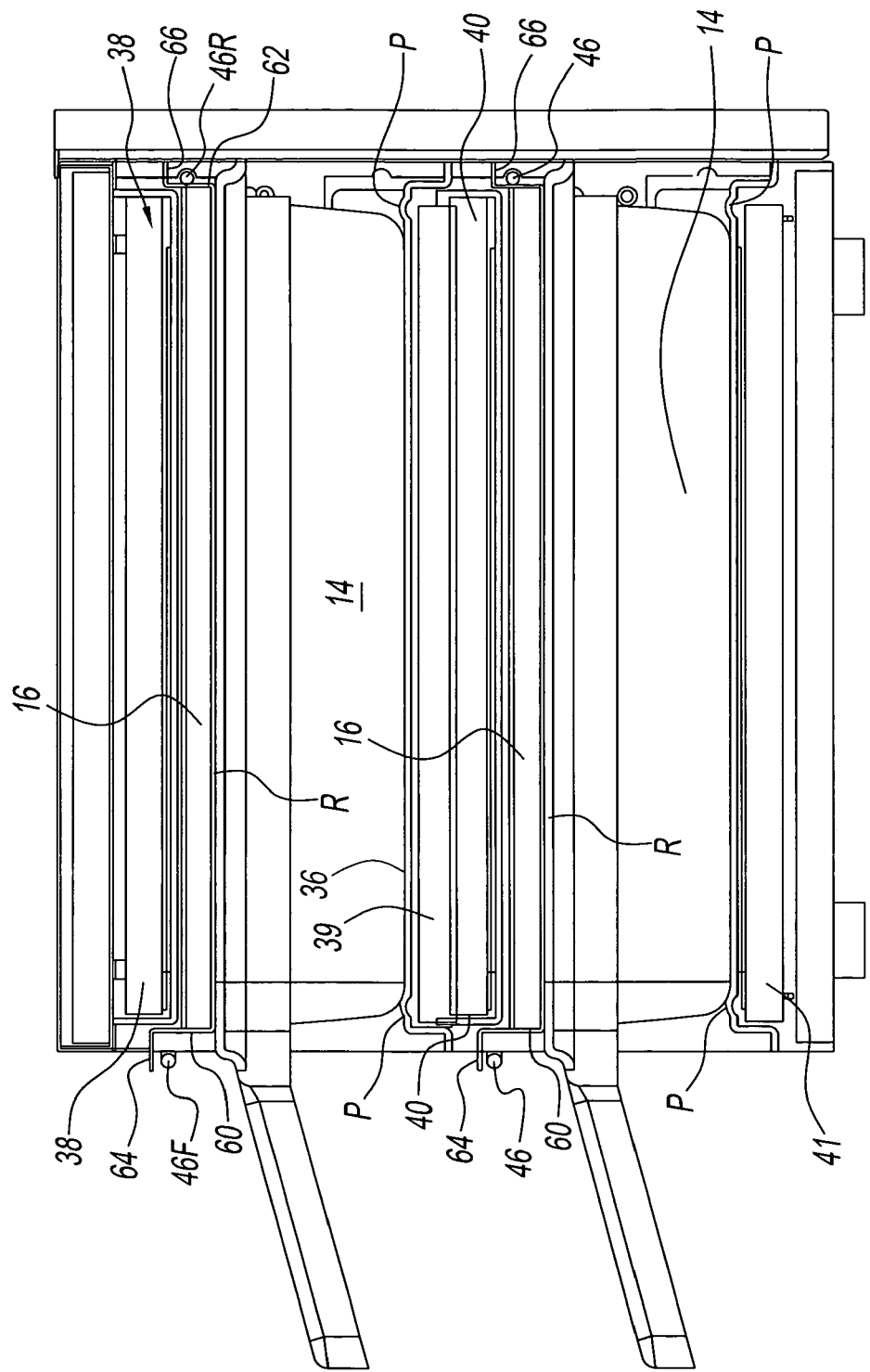
FIG. 11 is a side elevational view of the holding cabinet of FIG. 3 with its facing side wall removed, showing the front end of a lower tray cover resting on the floor of its tray location after removal of the tray cover's underlying tray and after the lower front rod has been moved proximally as shown in FIG. 10.

Preferably, each front support structure 46F has a central portion CP between and communicating with and near its respective opposed ends, an angled joint or bent portion 48 relative to central portion CP and which forms an opposed end portion 50 all or a portion of which is, for example, seated in a hole, e.g., 52 in front wall 28 of housing 13 where end portion 50 is spring mounted or spring-loadedly mounted to housing 13. The spring mounting or spring loaded mounting can be effected, e.g., by passing a portion of end portion 50 through a coil spring 54 and affixing the far end of spring 54 to holding cabinet 12 and the proximal end of the spring to a proximal portion of opposed end 50 of support structure 46F. Spring-loading can be effected by any suitable means. For example, as shown in FIG. 11 at least one, preferably each end of a front support structure 46F can be severed and joined by a spring section 55. The distal severed end(s) SE can be threaded and affixed to housing 13 in hole 52 as by a nut 53 and the severed ends can be fixedly joined to each other by a coil spring 55. Thus, front support structures 46F can have opposed end portions 50 and a central portion CP between and communicating with the end portions, at least one, preferably each opposed end portion having a spring section 55 such that central portion CP is movable away from the first position to the second position and back toward the first position. The diameter of hole 52 can be close to that of front support structure 46F to constrain movement of the support structure to substantially orthogonal movement relative to front wall 28, or the diameter of hole 52 can be larger to allow radial movement of front support structure 46F as desired.

In a preferred embodiment of a holding cabinet of the invention, rear wall 30 which at least in part defines a heating chamber, is at least partly movable or removable (FIG. 16) so as to create a heating chamber rear opening. When rear wall 30 is moved or removed, e.g., singular, lower, or lower and upper, rear openings to one or more heating chambers are available. For example, the heating chambers of holding cabinet 12b are accessible from both front and rear.

In accordance with the invention, front and rear support structures, e.g., rods or bars, 46F and 46R cooperatively support or suspend a tray cover 16 above a tray location TL in a heating chamber until a food tray 14 is positioned in the tray location TL under the tray cover 16 and the food tray 14 lifts the cover from the rods and supports the cover. The rods increasingly suspend the cover again as the tray is being removed, and fully after the tray is removed from the tray location. As the trays begin to be removed, rods 46F engage the tray cover(s), e.g., their front walls 60 and prevent the covers from being removed with the trays from the heating chamber.

With particular reference to FIGS. 4 and 4A through 4G, a food tray cover 16 for covering a food tray for use in a food holding cabinet is disclosed. Food tray cover 6 is comprised of a recessed top central panel 54 which communicates with and is surrounded by upstanding pair of side walls 56 and 58 and with and by a pair of upstanding front and rear walls 60 and 62. The pair of side walls communicate with the pair of front and rear walls. Front wall 60 extends upwardly higher than rear wall 62, and higher than side walls 56, 58. Front wall 60 communicates with a forwardly extending front extension, preferably a front flange or lip 64. Rear wall 62 extends upwardly higher than side walls 56, 58 and communicates with a rearwardly extending extension, preferably a rear flange or lip 66. Preferably, front flange or lip 64 is longer, that is, extends forward further than rear flange or lip 66 extends rearward. Side wall 56 preferably includes or has a lower skirt portion 68 that extends downwardly below and along the length of top panel 54. Conveniently, cover 16 can be formed from a one piece blank such as that shown in FIG. 4D. Cover 16 can be made from any suitable material e.g., a suitable metal, metal alloy or plastic. A stainless steel of appropriate grade is preferred. The same applies for bars or rods 46 especially 46F.

Figure 4:
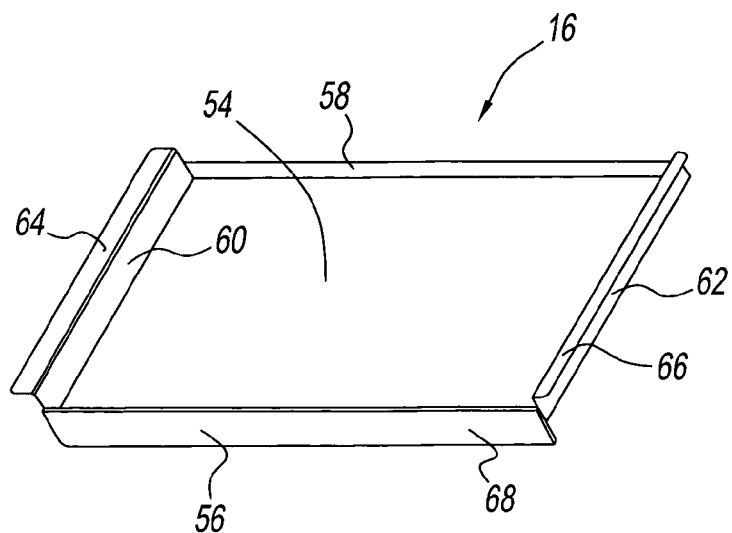
FIG. 4 is a top right side perspective view of a preferred tray cover of the present invention.
Figures 4A, 4B:
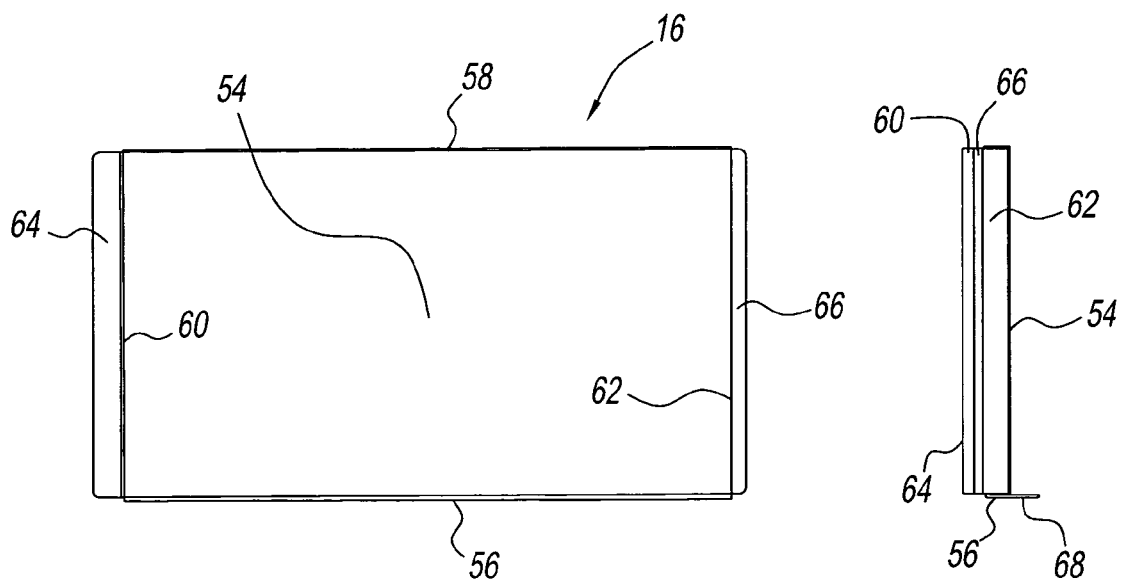
FIG. 4A is a top plan view of the tray cover shown in FIG. 4.
FIG. 4B is a rear elevational view of the tray cover shown in FIG. 4A.
Figure 4C:
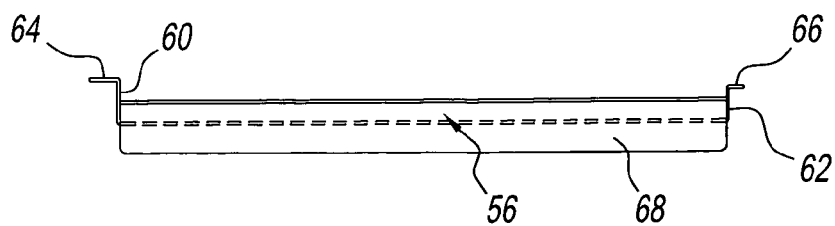
FIG. 4C is a side elevational view of the tray cover shown in FIG. 4A.
Figure 4D:
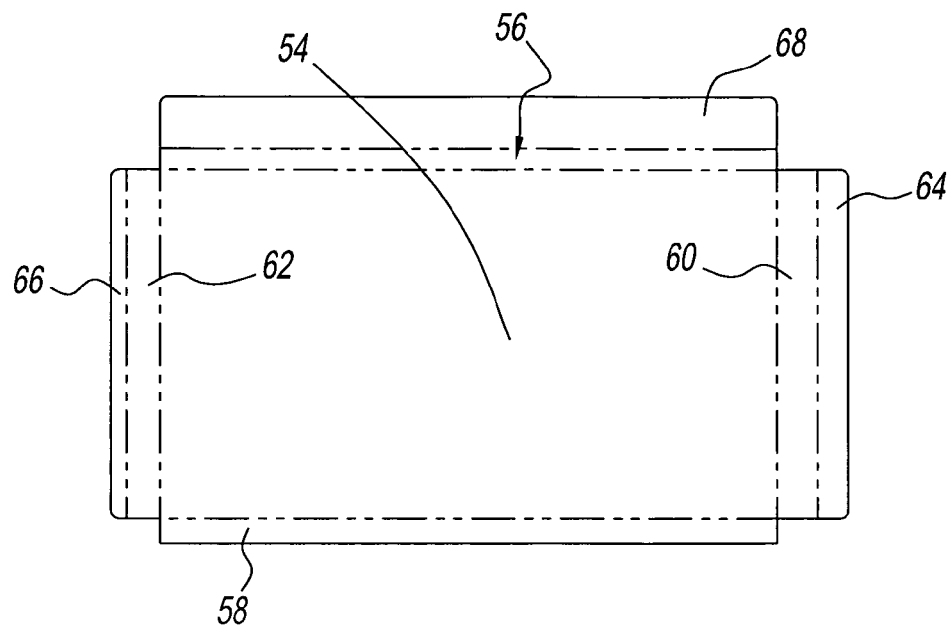
FIG. 4D is a top plan view of a blank for forming the preferred tray cover of the invention.
Figure 4E:
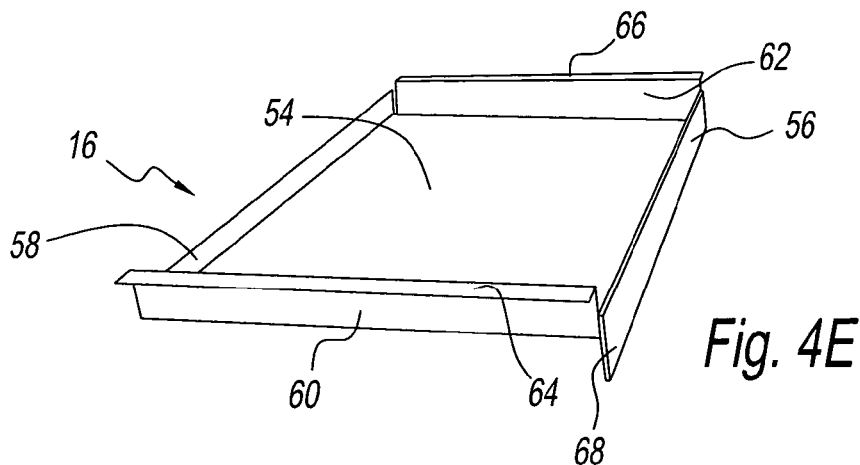
FIG. 4E is a front perspective view of the preferred tray cover of the invention.
Figure 4F:
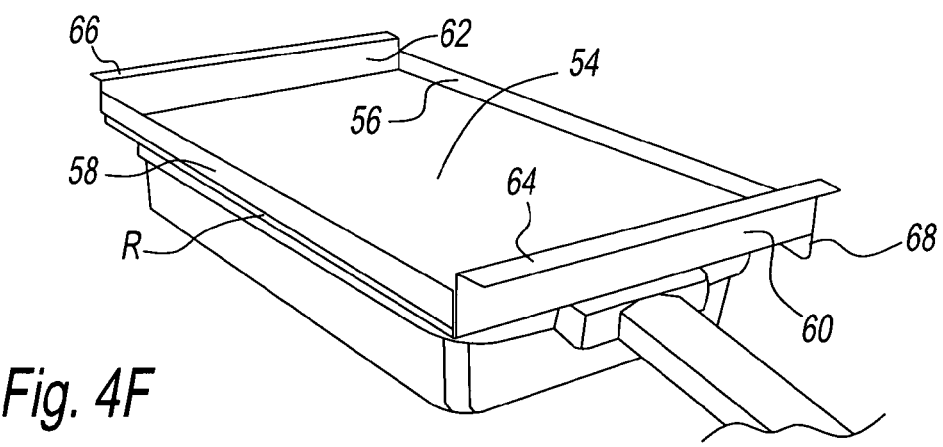
FIG. 4F is a front left side perspective view of the tray cover of FIG. 4E resting on a food tray.

FIG. 4E shows a cover 16 resting on a surface (not shown), and FIG. 4F shows cover 16 resting on top of the top edge or rim R of and fully supported by a tray 14, as is the case when and while a tray is fully inserted into a tray location fully under an overlying previously suspended cover 16. In this position, in a heating chamber, heat from an overlying heater is transferred through top wall 54 into the underlying tray and heat and moisture are retained there by the gravity seal of the cover on and around the rim of the tray. Heat from the overlying heater is also retained above cover top wall 54 by cover perimetral front and rear walls 60 and 62 and side walls 56 and 58. The cover front, rear and side walls also provide rigidity to cover 16.

Figure 4G:
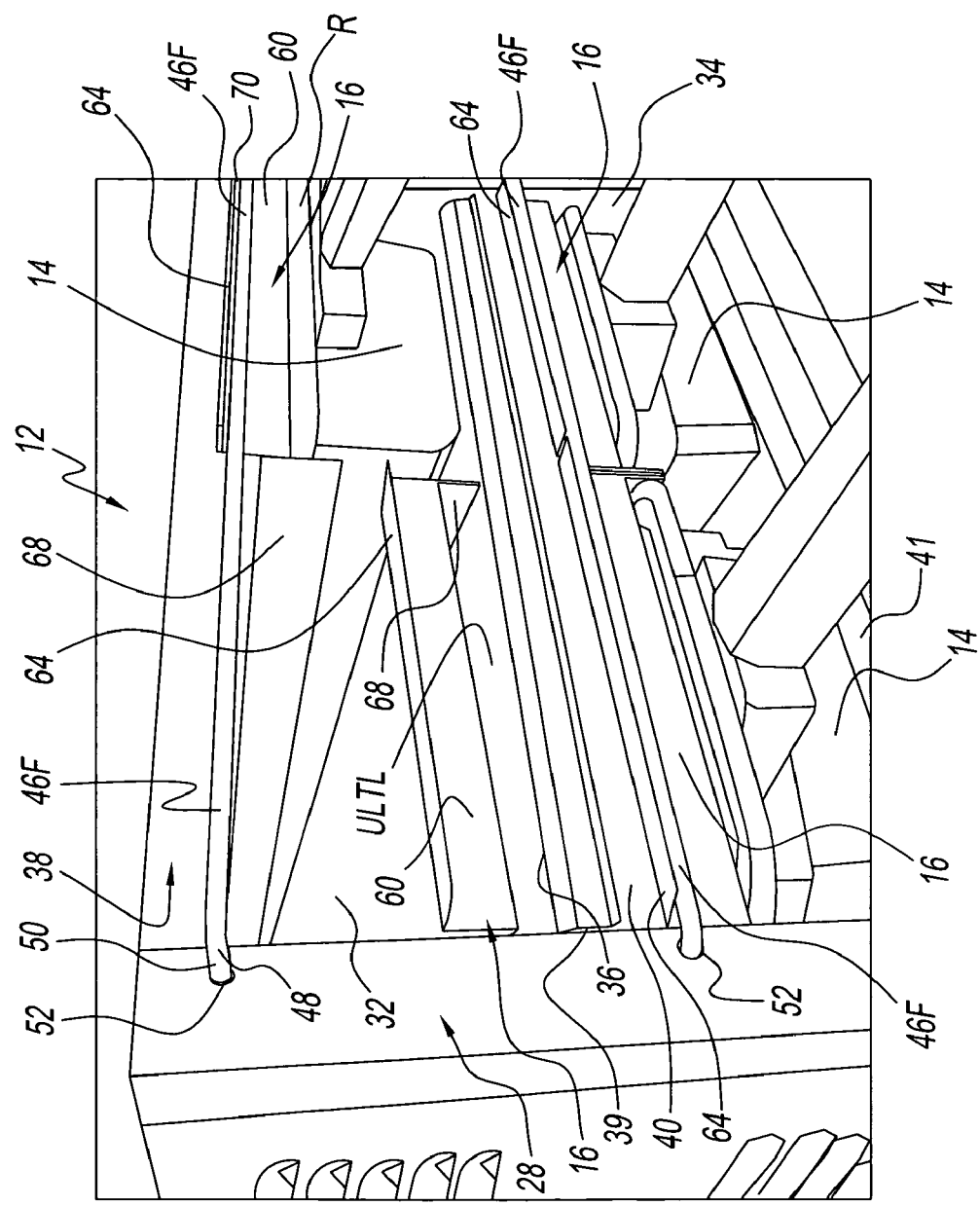
FIG. 4G is an enlarged front left side perspective view with portions not shown, of a holding cabinet of the invention showing upper and lower front support bars mounted on the front of the cabinet above and extending across the entrances to upper and lower tray locations, the upper left location having a cover of the invention resting on the floor of the tray location.

FIG. 4G shows a cover 16 lying on shelf 36 in the upper left tray location ULTL of upper heating chamber 32. FIG. 4G also shows upper and lower front rods 46F respectively extending across the upper portions of upper and lower heating chambers 32, 34 with bent portions 50 extending into holes 52 in front wall 28 of holding cabinet 12. Trays 14 are fully positioned under and supporting the other covers 16 in the other tray locations in holding cabinet 12. Accordingly, there is a gap or space 70 between front rods 46F and cover front flanges or lips 64 at the tray locations where trays 14 are under and supporting covers 16.

Figure 5:
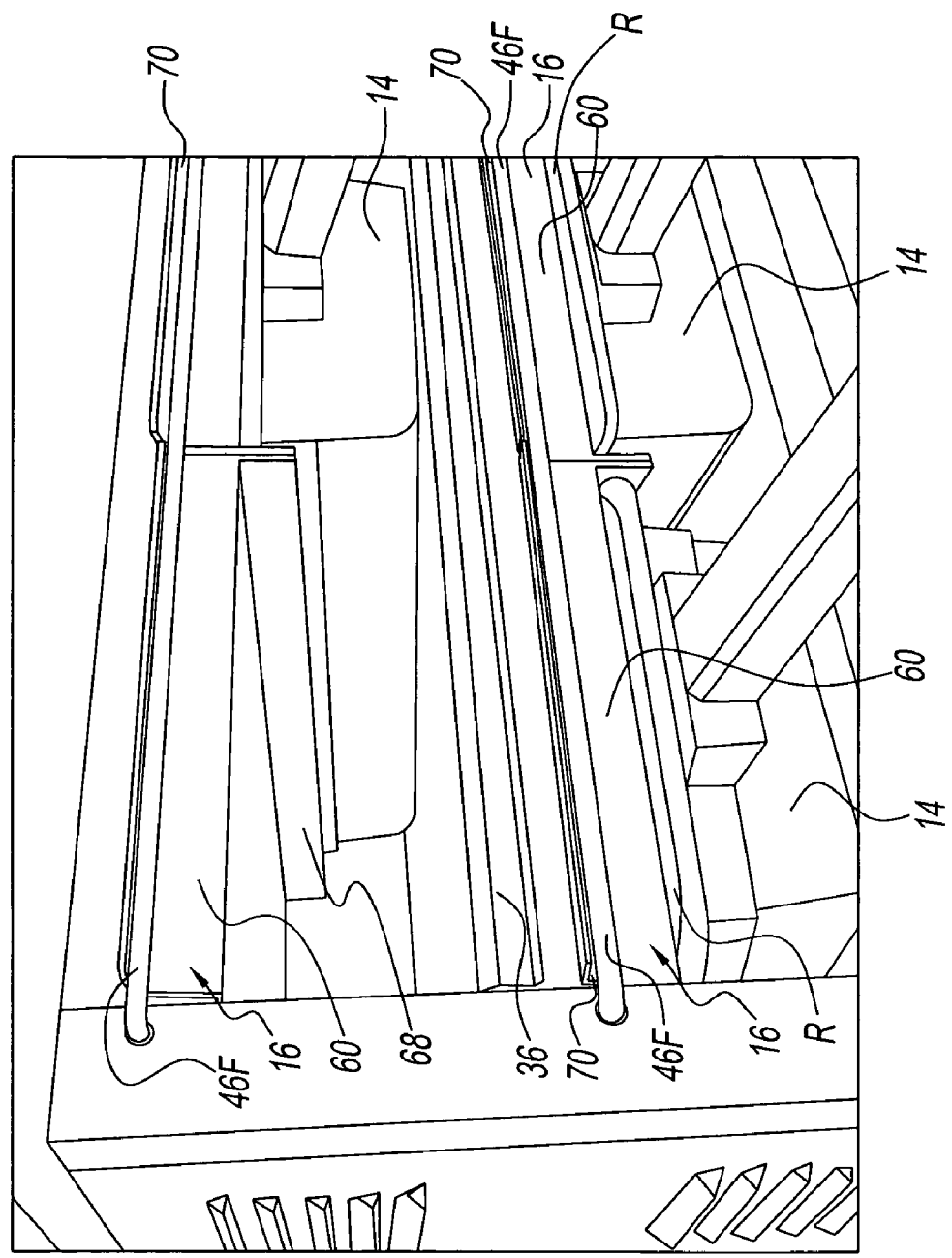
FIG. 5 is an enlarged front side perspective view with portions not shown of the holding cabinet of FIG. 4G, showing the cover previously resting in the upper left tray location, now supported and suspended from the front and rear support rods at that tray location.

FIG. 5 is similar to FIG. 4G except that in FIG. 5, the cover 16 that was lying on shelf 36 of FIG. 4G is now shown suspended from front and rear rods 46, the rear rod not being shown. In FIG. 5, front lip 64 of cover 16 that is not supported by a tray 14 rests on front rod 46.

Figure 6:
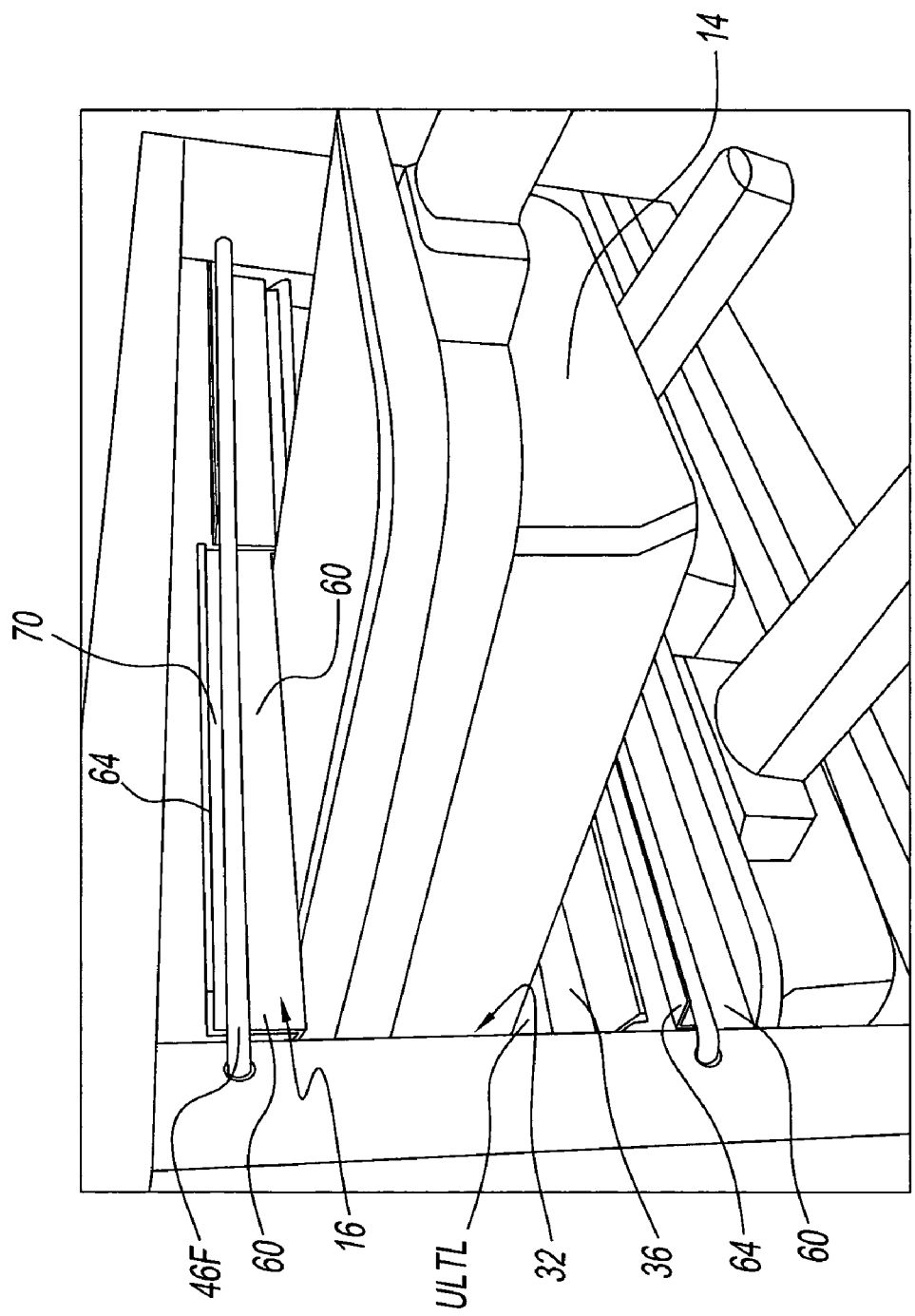
FIG. 6 shows a food tray being inserted into the upper left tray location of FIG. 5.

FIG. 6 shows a tray 14 being inserted into the upper left tray location ULTL shown in FIGS. 4G and 5. As tray 14 is inserted it engages and lifts cover 16 from front rod 46F, as indicated by the space 70 visible between front rod 46F and front lip 64 of cover 16. Once tray 14 is fully inserted into the tray location, cover 16 is fully supported by tray 14 and space 70 remains until tray 14 is withdrawn from under cover 16. The upper surface of shelf 36 may be provided with one or more front raised protrusions (FIG. 11A) to align and seat tray 14 in the proper location in upper heating chamber 32. Thus, when tray 14 is pushed into heating chamber 32, under cover 16, the bottom of the tray will slide over the protrusion and into the proper aligned location. While the protrusion may tend to prevent tray 14 from moving proximally toward the user, cover 14 primarily is prevented from moving proximally by the engagement of cover front wall 60 with front rod 46.

Figure 7:
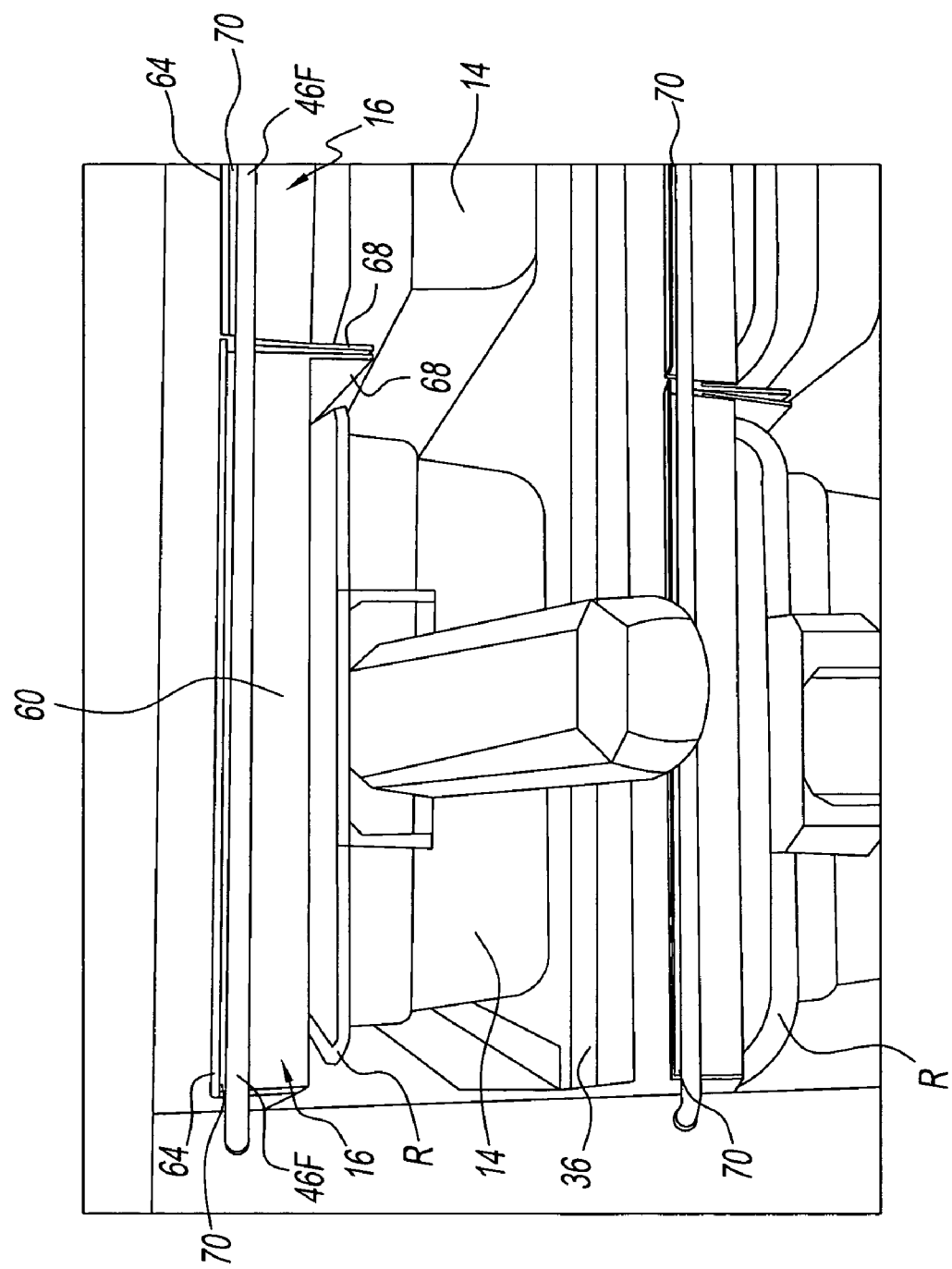
FIG. 7 is front view of a portion of the holding cabinet of FIG. 6 showing the tray almost fully seated in the upper left tray location and the overlying cover resting on the tray.

FIG. 7 shows tray 14 fully seated in the upper left tray location ULTL, and overlying cover 16 supported on tray 14, such that there is a space between front lip 64 of cover 16 and front rod 46. FIG. 7 also shows a tray 14 in the upper right tray location fully supporting its cover 16. FIG. 7 additionally shows depending skirts 68 of covers 16 next to one another.

Figure 8:
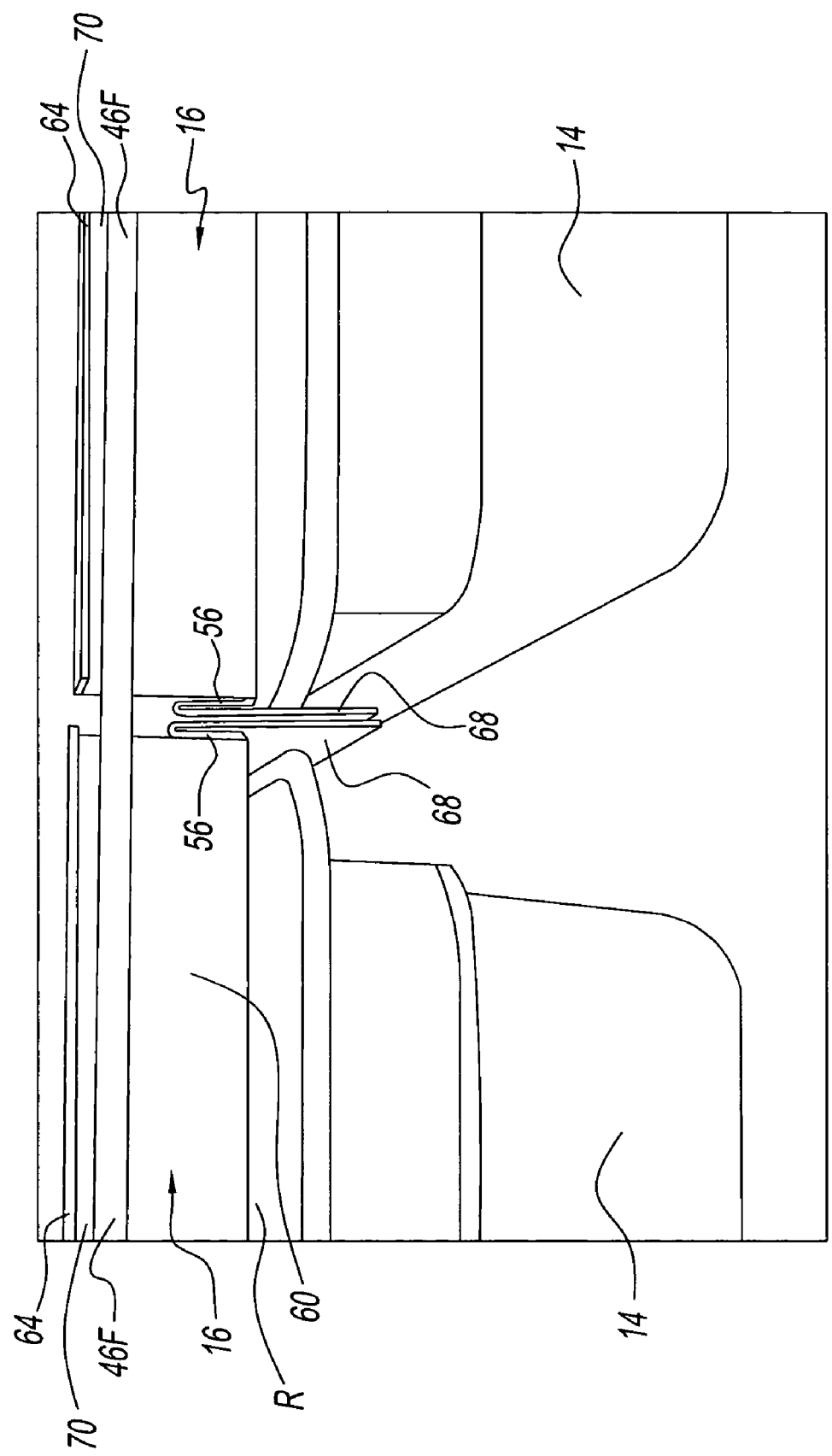
FIG. 8 is an enlarged view of a central portion of the upper heating chamber of the holding cabinet of FIG. 7.

FIG. 8, an enlarged view of a portion of FIG. 7, clearly shows the spatial relationship (space 70) between front lip 64 of cover 16 and front rod 46F with respect to both fully inserted trays 14. FIG. 8 also clearly shows respective cover side walls 56 folded over and forming skirts 68 which depend next to each other and separate the covers and rims of the trays from one another. Skirts 68 act as guides for centering and aligning the trays and covers as they are inserted into and removed from their tray locations.

Figure 9:
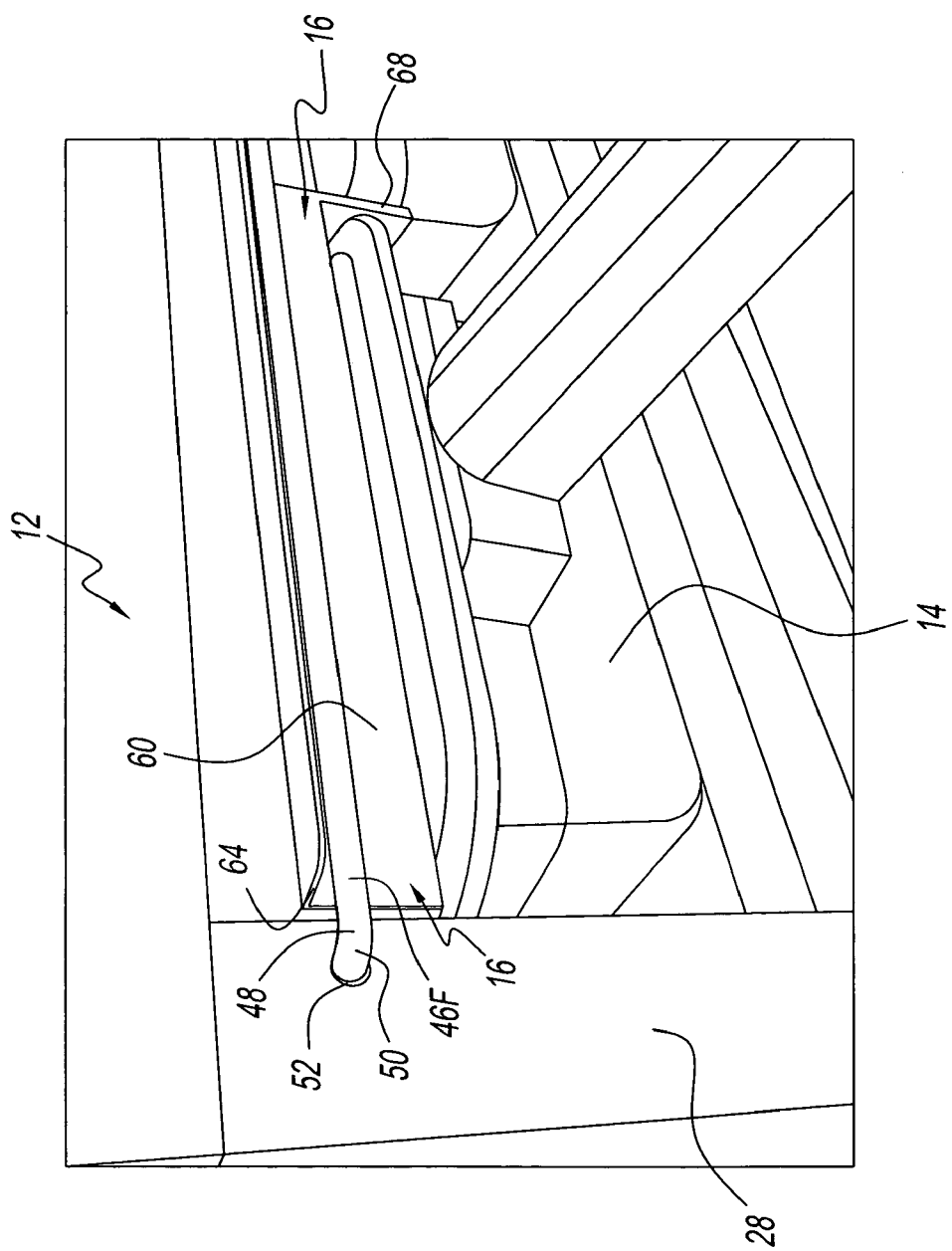
FIG. 9 is a front side perspective view of the upper left tray location showing the cover resting on its underlying tray.

FIG. 9 shows how one end of front rod 46F is mounted to front wall 28 of holding cabinet 12. More particularly, FIG. 9 shows bent portion 48 of front rod 46F forming end portion 50, and end portion 50 entering hole 52 in front wall 28 wherein rod 46F preferably is spring-loadedly secured to front wall 28.

Figure 10:
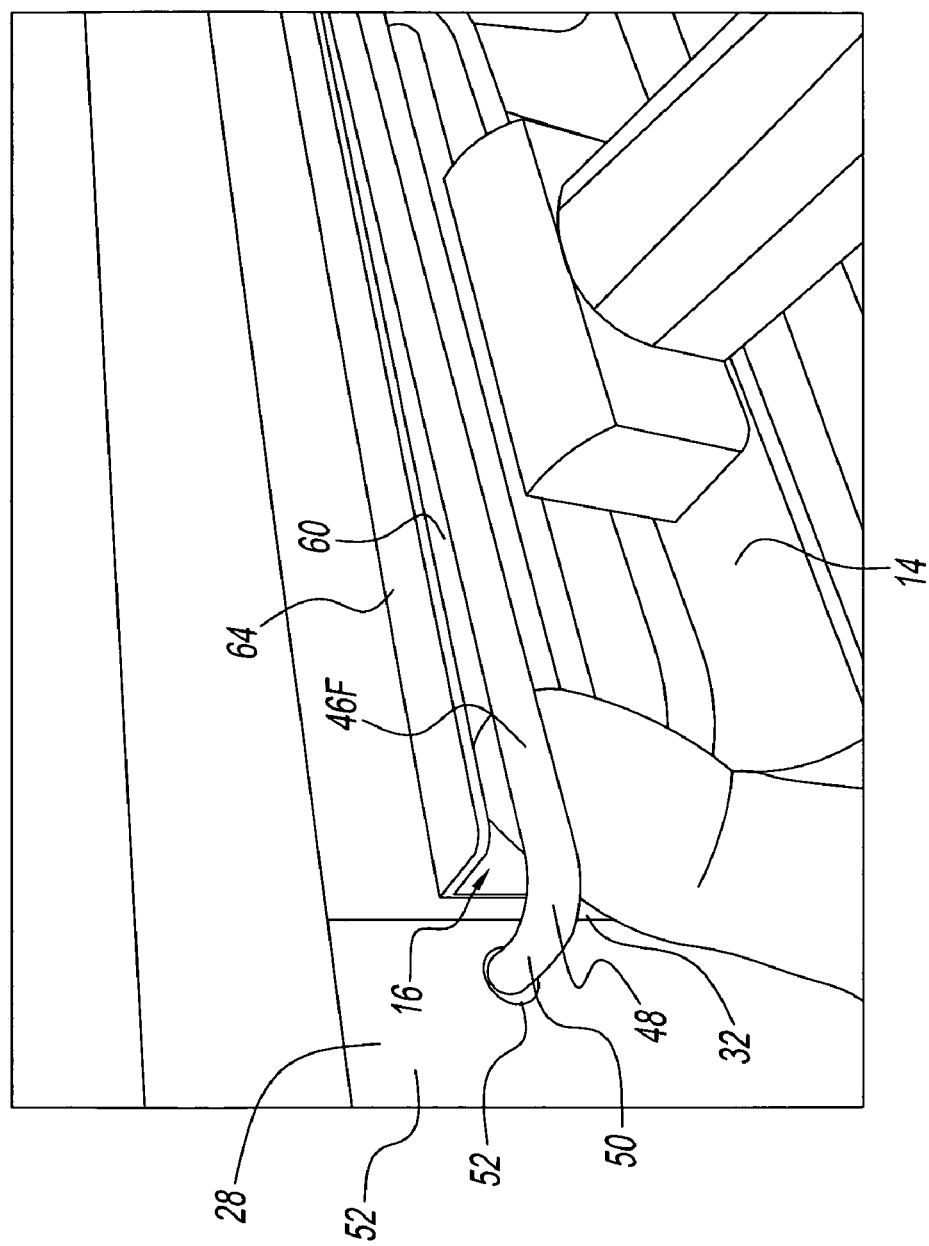
FIG. 10 is an enlarged view of the holding cabinet portion of FIG. 9 showing a user's finger pulling the left end portion of the spring-mounted rod proximally beyond the front lip of the tray cover.

FIG. 10 shows a user's finger pulling the left end portion 50 of rod 46F proximally away from front wall 28 and proximally beyond lip 64 of cover 16 to allow cover 16 to be lowered below lip 64 and removed from heating chamber 32.

FIG. 11 is a side view of food holding cabinet 12b of FIG. 1B with side wall 26 and control panel CP removed. FIG. 11 clearly shows trays 14 fully seated in upper and lower right tray locations with their rims R under and fully supporting covers 16 such that cover front lips 64 of front walls 60 are spaced above front rods 46F, and cover rear lips 66 of rear walls 62 are spaced above rear rods 46R. FIG. 11 also shows cover front walls 60 just in front of the respective front vertical walls of upper and lower heaters 38, 40 and rear walls 62 just to the rear of the rear vertical walls of heaters 38, 40 to help stabilize trays 16 in their respective tray locations. FIG. 11 also shows rear lips 66 up against the rear wall of heating chambers 32 and 34. This also helps to keep covers 16 in place.

Figure 11A:
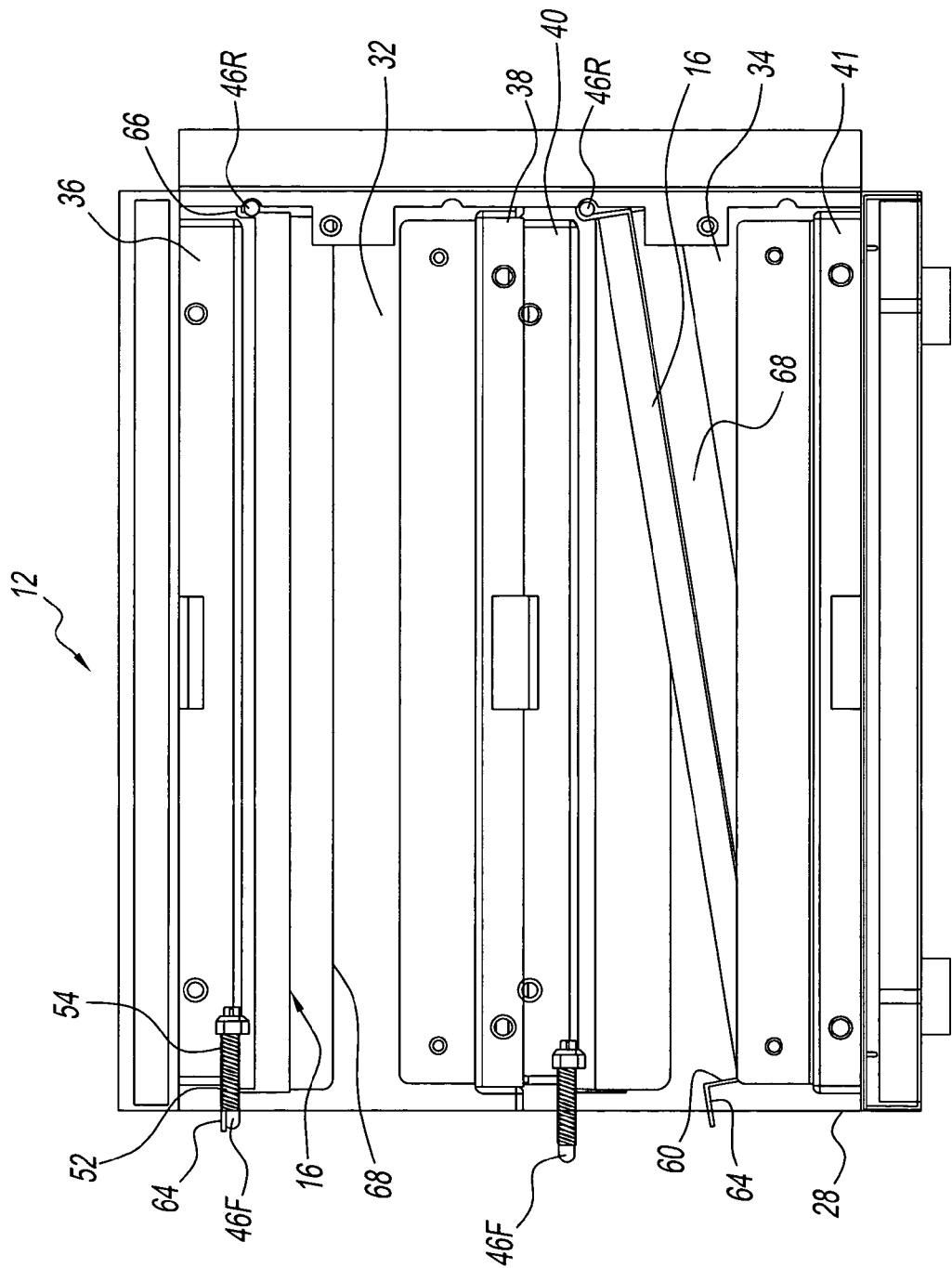
FIG. 11A is a side elevational view of the holding cabinet similar to that shown in FIG. 2A with its facing side wall removed, showing upper and lower right tray covers resting on respective underlying food trays.

FIG. 11A shows upper and lower heating chambers 32, 34 with food trays 14 removed. In FIG. 11A, upper front rod 46F is in its inward normally mounted position, and, with rear rod 46R, is supporting a tray cover 16. Lower front rod 46F is in its proximally pulled cover front lip 64 releasing position away from front wall 28 of holding cabinet 12 thereby releasing front lip 64 from rod 46F and allowing the front portion of lower cover 16 to have been lowered for removal from lower heating chamber 34. Rear lip 66 of cover 16 has pivoted on and is shown still supported on lower rear rod 46R. With tray 14 removed, the front portion of cover 16 is resting on the upper surface of the floor of lower heating chamber 34.

Figure 12:
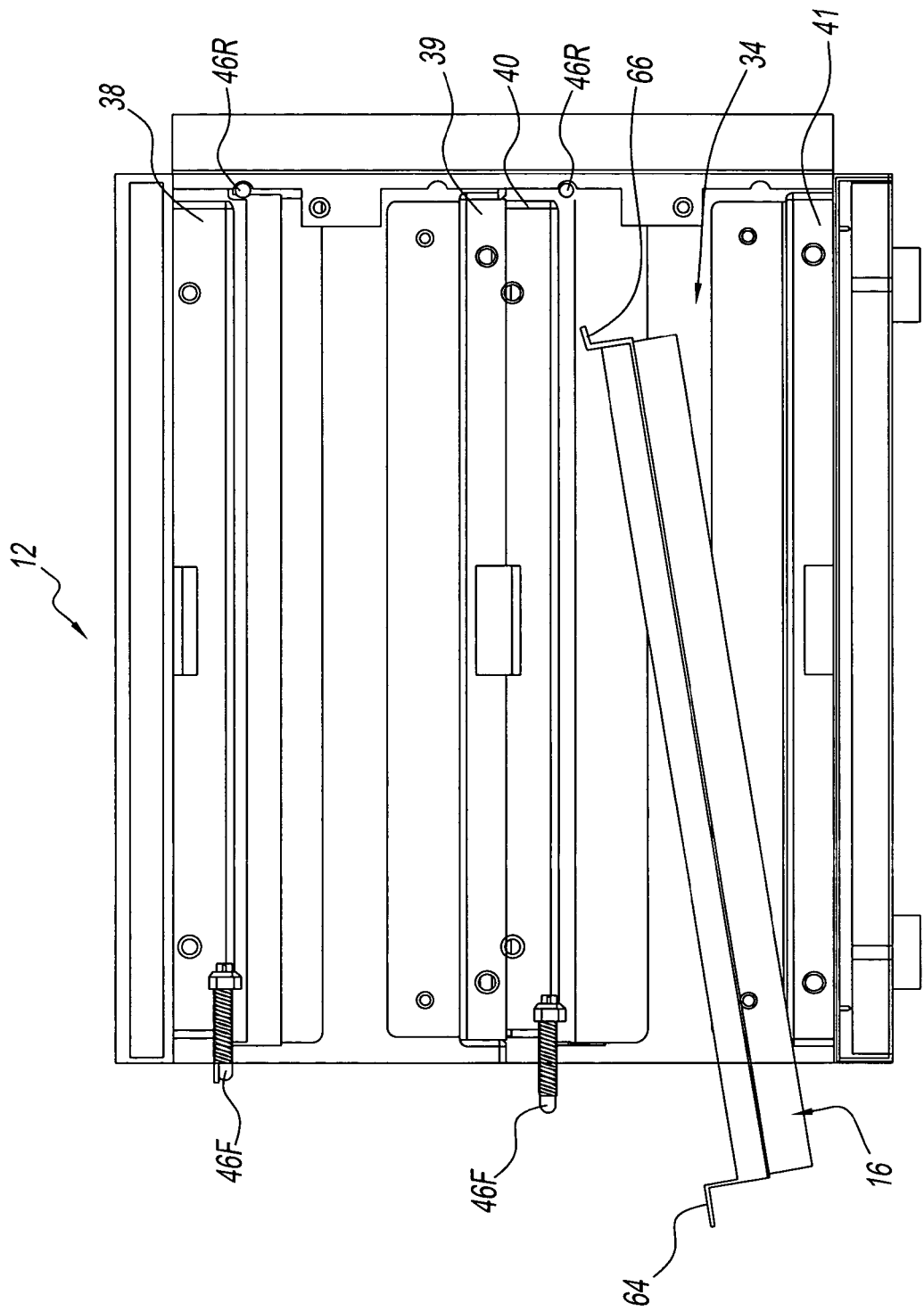
FIG. 12 is a side elevational view of the holding cabinet of FIG. 11 showing the cover of FIG. 11 being removed from the holding cabinet.

FIG. 12 shows cover 16 of FIG. 11A further removed proximally from lower heating chamber 34. Rear lip 66 of cover 16 is no longer supported on lower rear rod 46F.

Figure 13:
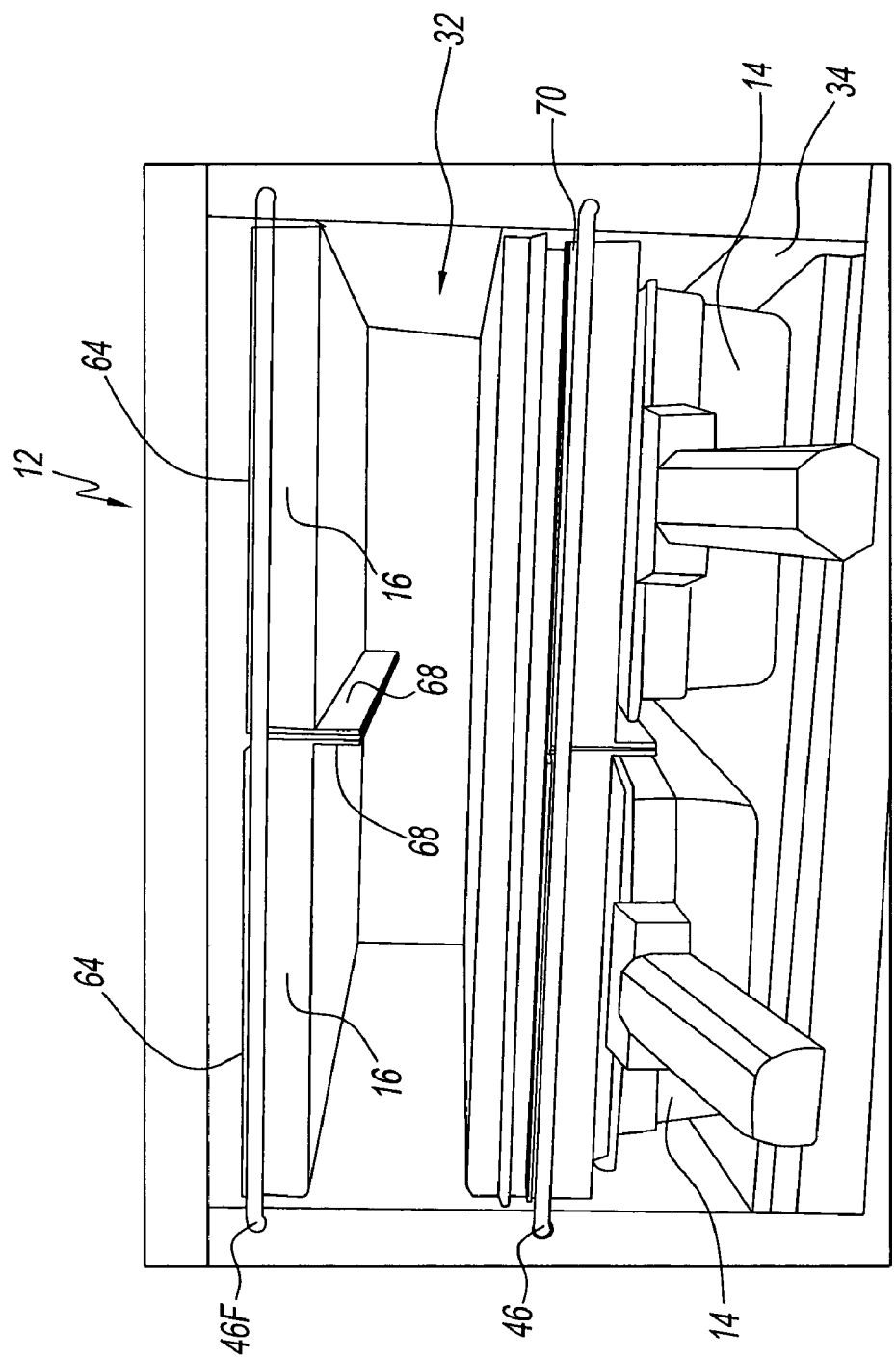
FIG. 13 is a front elevational view of a preferred holding cabinet showing in the upper tray locations, two side-by-side tray covers suspended from front and rear support rods, only the front support rods being shown.

FIG. 13 shows upper heating chamber 32 with two tray covers 16 suspended side-by-side on upper front rod 46F and on upper rear rod 46R (not shown), each cover being shown with no tray thereunder. Lower heating chamber 34 has two covers side-by-side each supported by an underlying tray 14. Rear wall 30 has been removed.

Figure 14:
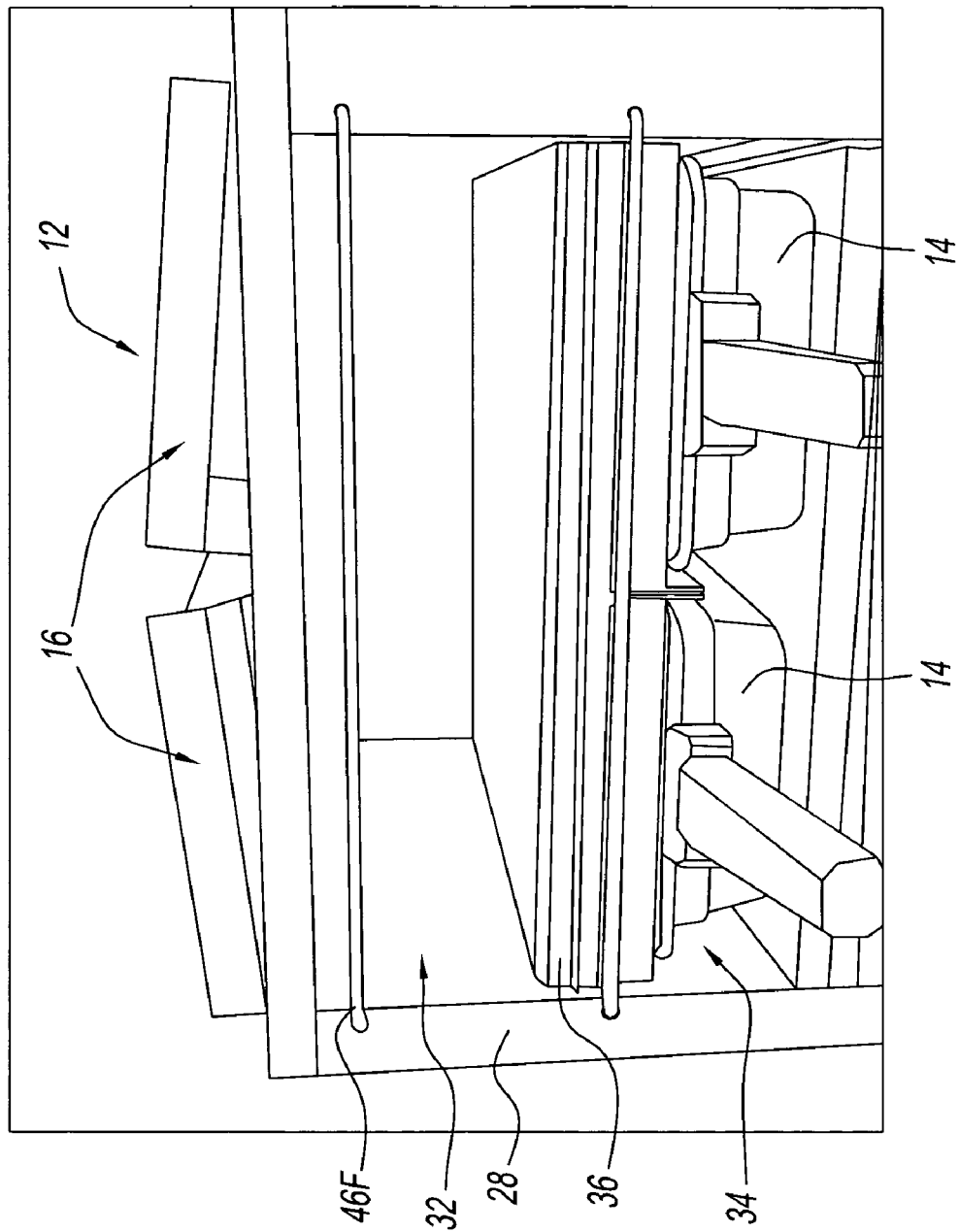
FIG. 14 is a front elevational view of the holding cabinet of FIG. 13 showing the upper front rod without the two tray covers of FIG. 13.

FIG. 14 is similar to FIG. 13, except that in FIG. 14 the two covers 16 have been removed from upper heating chamber 32 and placed on top of food holding cabinet 12. FIG. 14 shows that with covers and trays removed, upper heating chamber 32 is unencumbered and its walls and surfaces are easily accessible for cleaning from front and preferably also rear heat chamber openings.

Figure 15:
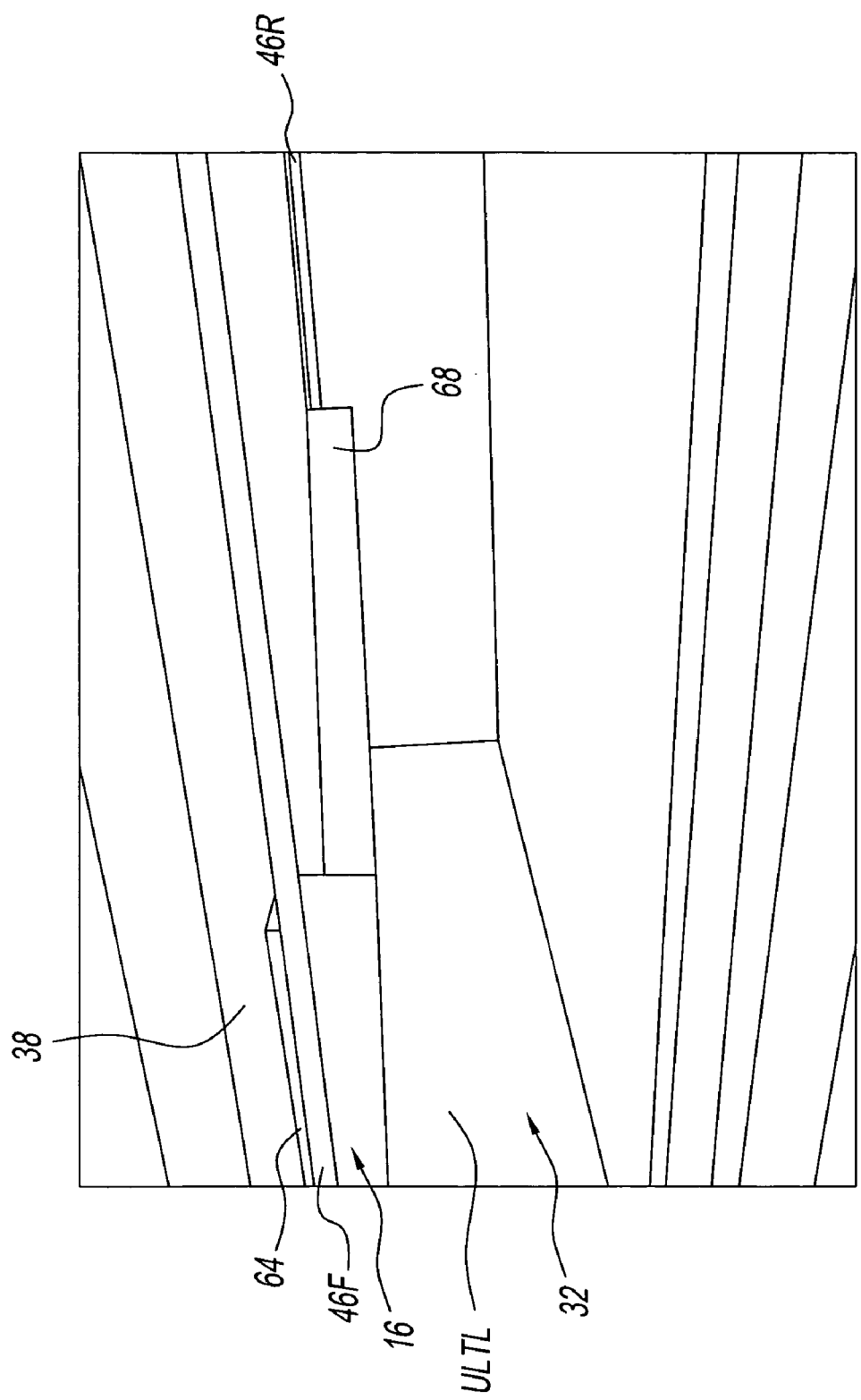
FIG. 15 is an enlarged front side perspective view with portions not shown of the upper left portion of a holding cabinet of the invention with a cover suspended therein.

FIG. 15 shows a rear rod 46R and a tray cover 16 suspended in the upper left tray location ULTL of upper heating chamber 32 by upper front and rear rods 46F, and 46R. FIG. 15 also shows that there is a small space or gap between upper heater 38 and the uppermost surfaces, including the upper edges of suspended cover 16. There preferably is also an even smaller space or gap between the uppermost surfaces of cover 16 and upper heater 38 when cover 16 is supported by tray 14. The aforementioned small spaces or gaps minimize heat loss from the heating chamber openings.

Figure 16:
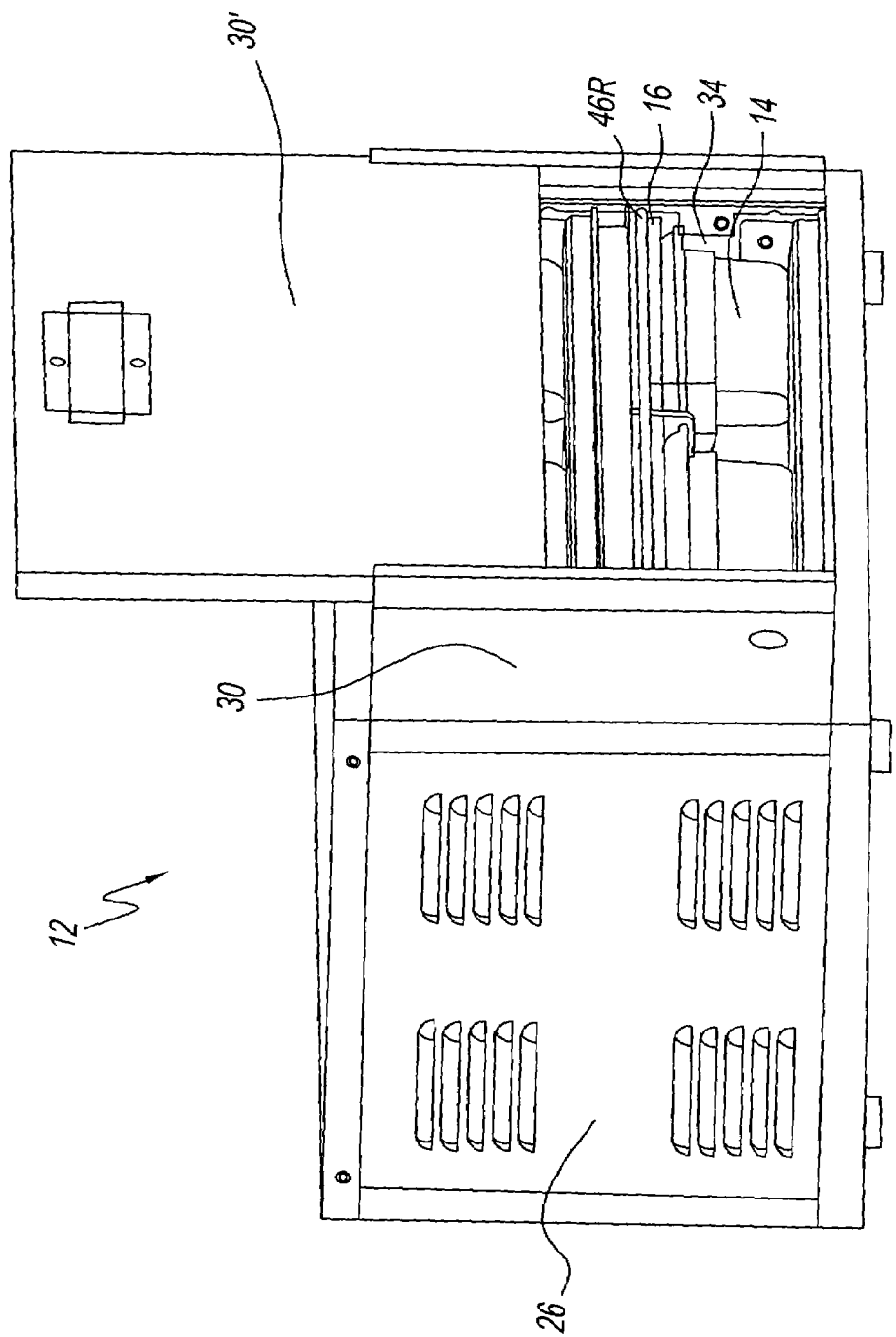
FIG. 16 is a rear side perspective view showing a holding cabinet of the invention with the back wall partly removed.

FIG. 16 shows an embodiment of holding cabinet 12 having a removable back wall portion 30' that is shown partially lifted and exposing the rear portion of lower heating chamber 34 with trays 14 therein and supporting covers 16 such that they are not resting on rear rod 46R. With back wall removed, food holding cabinet 12 can be used as a pass through unit. Employment of a spring-loadedly mounted rear rod 46R facilitates rear removal of covers 16 from the unit. Also, a removable wall facilitates cleaning of the removed wall.

In another feature of the invention, improvements in the design of surface heaters provide improved temperature separation between tray or bin locations to limit temperature bleed over between bin locations for more accurate temperature control between products. In preferred embodiments, for example, in food holding cabinet 12b of FIG. 1B, there are eight heaters, one mounted above and another mounted below each of the upper left and right tray locations, and one mounted above and another mounted below each of the lower left and right tray locations.

Figure 17:
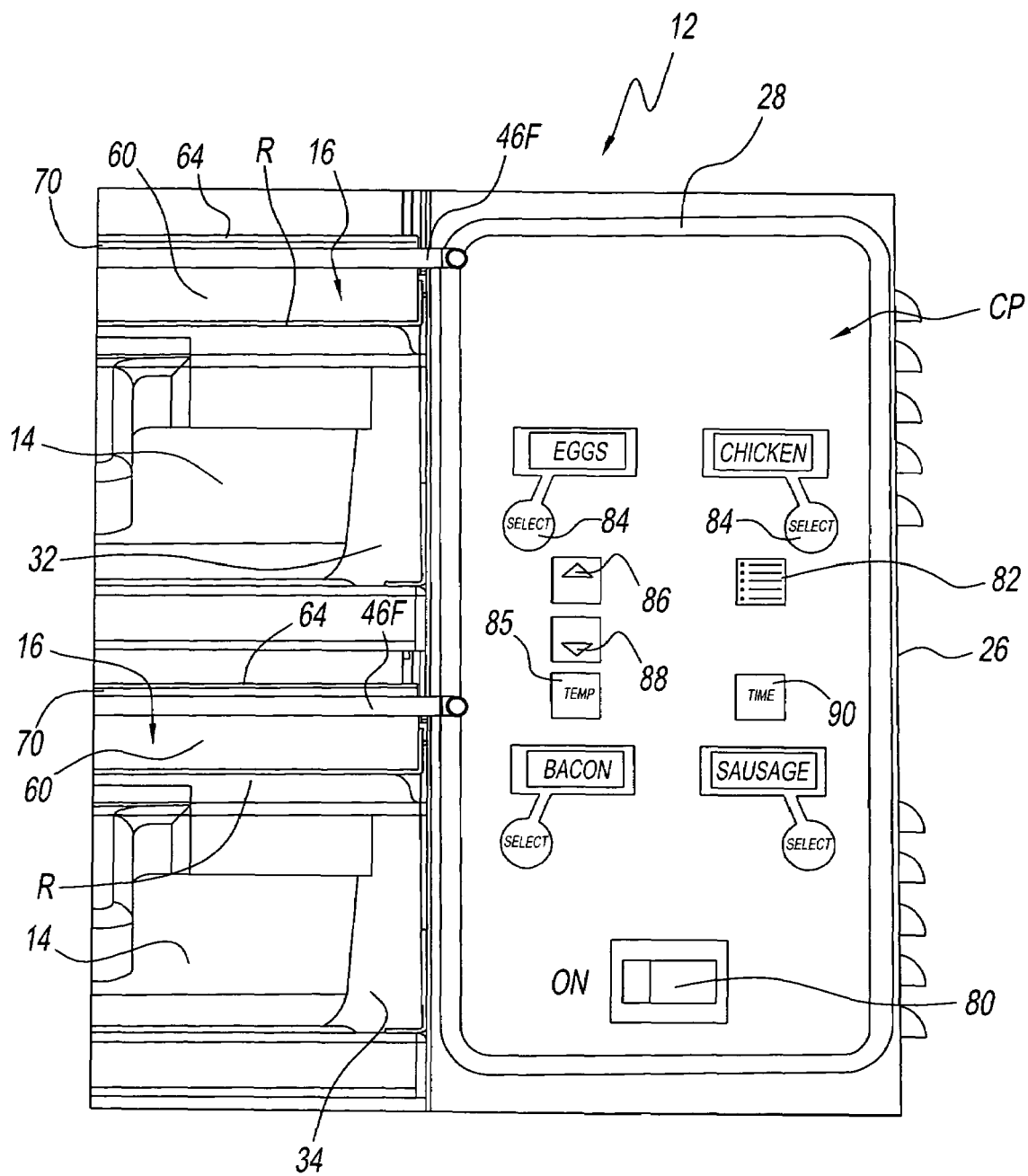
FIG. 17 is a front elevational view of a portion of a preferred holding cabinet of the invention, showing its control panel.
Figure 18:
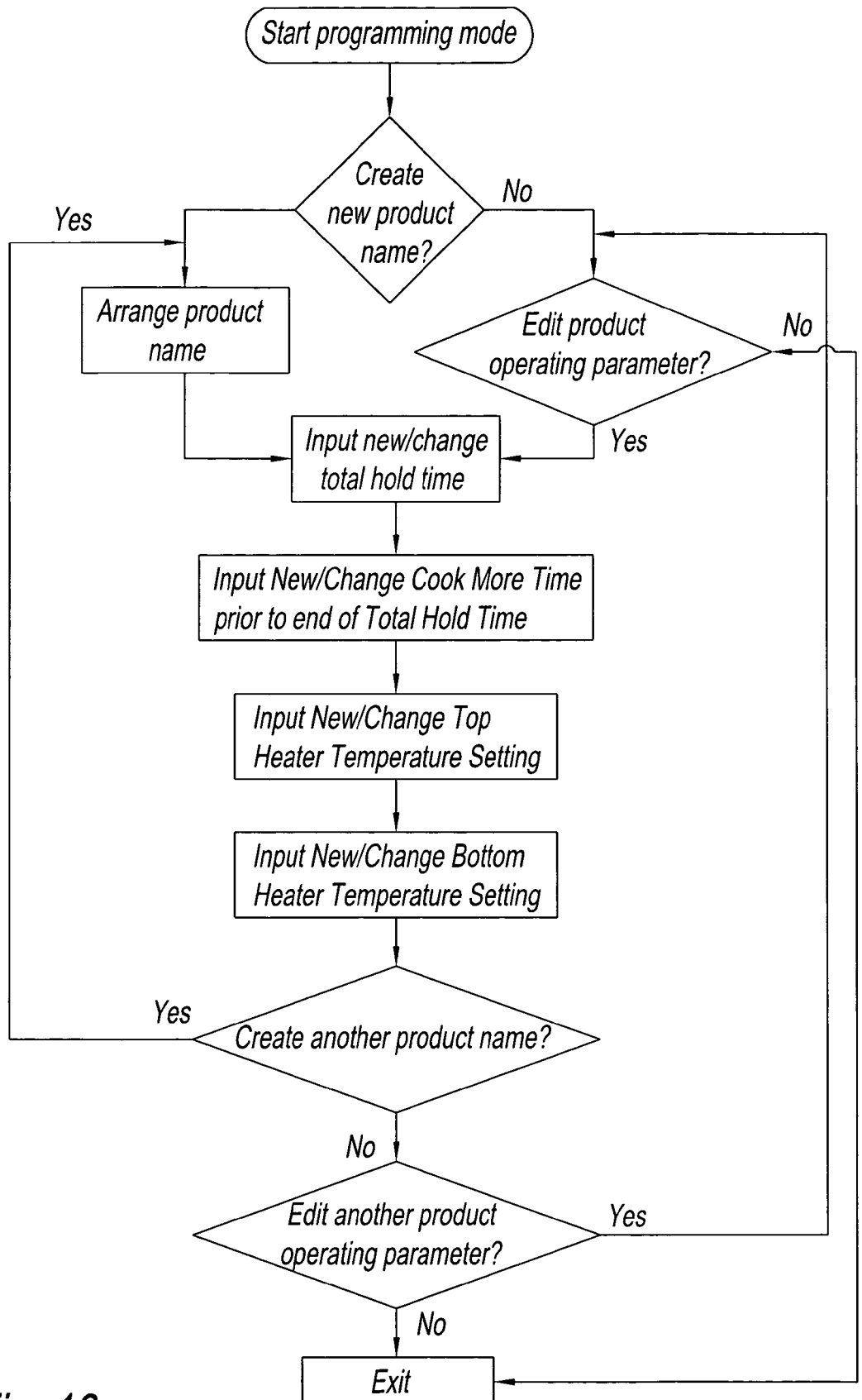
FIG. 18 is a logic flow chart for assigning or editing product operating parameters.
Figure 19:
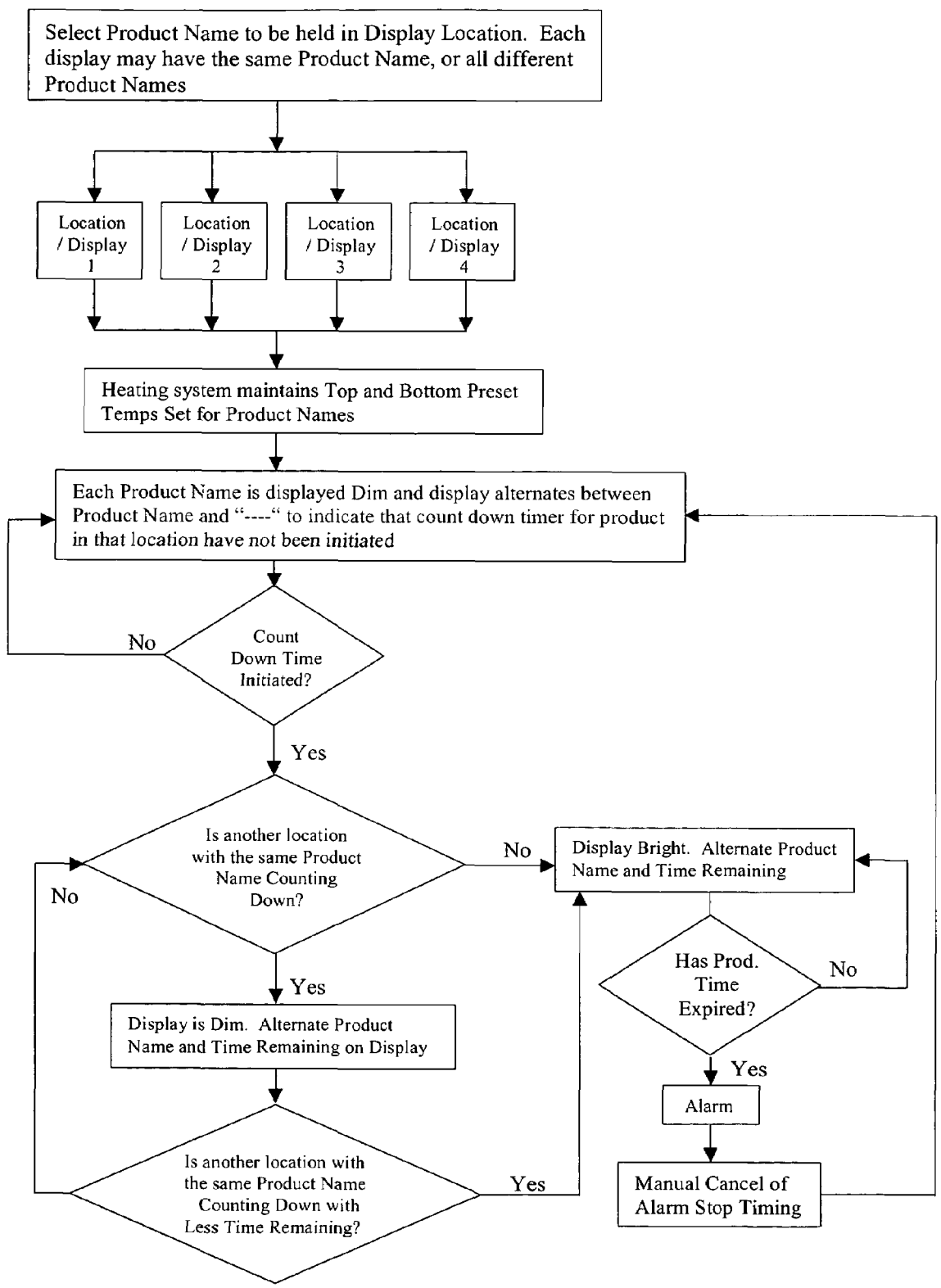
FIG. 19 is a logic flow chart for front panel light indicators for when product is in a count down mode.

FIG. 17 shows an embodiment of a conventional display control panel CP. Briefly, control panel CP includes an on/off button 80, a program/menu control button 82 for accessing a given list of food items to be held in holding cabinet 12, and four food item Select or Bin buttons 84, one for each quadrant of the overall heating chamber. Control panel CP also includes temperature control buttons 85, 86, 88 for respectively setting, raising and lowering, the temperature of each quadrant of the overall heating chamber, and a time button 90 for setting and counting down the time set for each quadrant of the heating chamber.

In accordance with another aspect of the invention disclosed herein, a food holding cabinet, for example, one of the ones disclosed herein, can be programmed to provide that food product holding parameters are assigned to and follow the name of the food product, not the tray or bin location of the food product in the cabinet. Thus, whereas most holding cabinets assign top and bottom temperature and count down timings to a position in the cabinet and a product name is assigned to the location, the present programming aspect of the invention assigns the holding parameters, top and bottom temperature and count down timings to the product name, so wherever the product name is displayed, the holding parameters follow. More particularly, unique control features of the invention provide control over the total holding time, upper and lower heat settings that are that are programmed into the software for each product name. Thus, the product holding parameters are tied to the product name and not a specific location in the cabinet, no matter at which locations the product name is displayed, even with multiples of the same product being held in the same cabinet. Further, the location and/or how many of the same product names are set in the bin position are unique. Still further, timings, temperatures top and bottom, and first in/first out follow the product name and are not determined by a location in the holding cabinet. This means that when a product name is programmed in, the holding parameters exclusive to that product name are programmed in. Yet further, unique features include: a product total hold time alarm; temperature settings for the top and bottom heater that are set to the product name and no matter how many locations have the same product name displayed [1 location up to all locations], the controller will display the remaining time and product name; and, when multiple same product names are displayed, the intensity of the light displayed is brighter for the oldest product than the intensity of display for the younger products in the cabinet. This accomplishes a first-in first-out product utilization system. If there are multiple same names displayed, the controller differentiates the oldest product location from the rest of the same name locations to indicate which of the locations to use first.

Another feature of the invention disclosed herein is a control panel display that indicates the first product into a tray location if more than one location is assigned the same product. The first in display feature allows an operator to find and use the old product first thereby reducing waste. This is done by display intensity, the brightest display indicating the product being used first.

The holding cabinet of the invention enables foodservice operators to cook menu components or product in advance and then gently store that product in the tray locations or holding bins until an order is received. Once that order is received, the operators can assemble the order using hot and fresh menu components from the holding bins. This allows operators to "serve to order," and help increase speed of service while maintaining high product quality standards.

In accordance with the invention, the holding bin controller is, at all times, operating in one of three modes: the normal mode, programming (menu or product) mode, or diagnostic mode. The latter mode will not be discussed.

In the normal mode of operation, the product for each bin is displayed, and timers are activated for loaded bins. A menu defines which products are in each bin. Press and hold the menu button to change menus. If the menu is changed while product is located in its corresponding bin, the bin setting will not change until product has been removed and the bin is empty.

Typical food holding cabinet operator actions include:

Turn Unit On: Push "Power On/Power Off" button. Green "Power" button will illuminate in "on" position.

Load bin with product and start timer: Pull out tray, load product and reinsert tray into bin. Push and hold "bin" button. Bin display will change to show presence of product. Control will sound one short beep. Release hold of "bin" button.

Empty bin and stop timer: Pull our tray and remove product. Reinsert tray. Press and hold "bin" button. The bin display will indicate "empty" bin. Control will sound one short beep.

Normal control panel display modes include:

Each bin display consists of two parts, a primary and secondary message word. These words are displayed one after the other, repeating regularly. The following sections describe the type of displays present under various conditions.

Bin Empty Display—Bin display is dimmed and shows the product name followed by "empty" to indicate that bin is empty.

Bin Loaded—Bin display shows the product name followed by a brief display of the time remaining until the product expires. Display will normally be bright unless another bin contains the same product. In the event two bins contain the same type of product, use the brightly illuminated bin first to maintain optimum freshness of product. If one of two bins containing similar product is emptied, the display for the other bin (containing similar product) will become bright.

In the programming mode, two types of parameters can be set through the front control panel: menu programming and product programming. Product programming is preset in the food holding cabinet by the manufacturer and should not need to be reset.

In the menu programming mode, set the food contents to be placed in each storage bin.

Step 1: Enter "menu programming mode". Press and hold "program" (green) button until you hear a short, double-beep sound.

Step 2: Set product parameters for an individual bin. Select desired bin by pressing the "bin" button. The display will go bright and display the first product in the list of available products. Use the "Up" or "Down" arrow (dark blue) buttons to toggle between available products.

Step 3: Save menu programming changes. Press and hold "program" (green) button until a short, double-beep sound is heard. Procedure is now complete. This procedure is to be repeated as each bin is programmed.

For the product programming mode, set the product names, storage times, and temperatures.

Since settings have been preset by the manufacturer, the following should not be employed unless the operator wishes to alter the preset programming.

In a food holding cabinet of the invention, if more than 14 seconds expires between operations all changes will be lost. To exit the programming mode without saving any changes, the "Program" button should be pressed briefly.

Step 1: Enter "product programming mode". Press and hold "program" (green) button until a short, double-beep sound is heard. Then, press and hold "program" (green) button a second time until another short, double-beep sound is heard.

Once the programming mode has been entered, the upper left display will go bright and all product parameters will be displayed. The other bin displays are used to display help words such as the parameter selected or possible actions.

Step 2: Select the product (food item) to be programmed. Use the "Up" and "Down" arrow (dark blue) buttons to select the product (food item) to program.

While toggling through the product list, the upper left bin display shows the product name followed by a brief display of a number representing its position in the list of products. This is useful should two products be changed to have the same name. Only one product can be programmed for each entry into product programming mode.

If no other changes need to be made, press and hold the "Program" (green) button until a short, double-beep sound is heard. This saves any changes that were made to the selected product and exits programming mode. If additional changes are to be entered, continue to Step 3 prior to saving.

Step 3: Set temperature for "Upper" and "Lower" heating zones. Press "Temperature" (red) button to select either "Upper" or "Lower" heating zones.

Step 4: Set temperature value for "Upper" or "Lower" heating zones. To change value of selected parameter, press the "Up" or "Down" arrow (dark blue) buttons. Press and hold the arrow button to auto repeat for large parameter value changes.

If no other changes need to be made, press and hold the "Program" (green) button until a short, double-beep sound is heard. This saves any changes that were made to the selected product and exits programming mode. If additional changes are to be entered, continue to Step 5 prior to saving.

Step 5: Access Product Name Programming. While in the product programming mode, press the top left "bin" button to reach "product name edit" mode. All but first character in the name will begin flashing.

Step 6: Edit product name. To edit first character (the one not flashing), press the "Up" or "Down" arrow (dark blue) button. To access other characters, press the bottom "bin" (left or right) buttons. Then press "Up" or "Down" arrow (dark blue) buttons to change characters.

If no other changes need to be made, press and hold the "Program" (green) button until you hear a short, double-beep sound. This saves any changes that were made to the selected product and exits programming mode. Step 6 completes all available changes to product programming.

The following is a representative sample of control panel operations for the holding bins of the most preferred food holding cabinet 12b shown in FIG. 1B.

| Display Modes Brightness Delay | First | Second | Description | First/Second in Sec |
|---|---|---|---|---|
| Dim | Product | "Empty" | Bin Empty | 1/1 |
| Bright | Product | Time Left | Product (Use First) | 4/1 |
| Dim | Product | Time Left | Newer Product | 4/1 |
| Bright | Product | Cook | Continue Cook | 2/1 |
| Dim | Product | Stop Cook | Empty Bin | 1/1 |

Bin Button
   Press and Hold to Reset Timer
   Press to Silence Alarm
   Press to Empty Bin
Alarm
   Interrupted sound for continue cook
   Solid sound for Empty Bin
   Change Button Labeled "Menu" to "Program Button or to an unlabeled button behind a logo.
Menu Mode
   Press button to toggle between Default Bin Product Selections
   Bin Product Display doesn't change until bin goes empty and Timer is Reset
Menu Programming
   Press and Hold "Program" button
   Select Bin to Program
   Use 'Up" and "Down" Arrows to Select Item from List of Products
   Press "Program" Button To Finish
Custom Menu Name Programming
   Press and Hold "Program" button
   Press and Hold "Program" button
   Use "Up" and "Down" Arrows to Select Product
   Press "Program" Button
   Use "Up" and "Down" Arrows to Select First Character of Product Name
   Press Bin Button To Advance to Next Character
   Repeat Last Two Steps to Set desired Product Name
   Press "Program" Button To Finish
Set Times - Continue Cook and Hold Times
   Press and Hold "Program" Button
   Press and Hold "Program Button
   Use "Up" and "Down" Arrows to Select Product
   Press Time button
   Use "Up" and "Down" Arrows to Set Hold Time (Time until product Expiration)
   Press "Time" Button
   Use "Up" and "Down" Arrows To Set "Continue Cook" Time
   Press and Hold "Program" Button To Finish
Set Temperatures
   Press and Hold "Program" Button
   Press and Hold "Program" Button
   Use "Up" and "Down" Arrows to Select Product
   Press "Temperature" Button
   Use "Up" and "Down" Arrows to Set Upper Heater Temperature
   Press "Temperature" Button
   Use "Up" and "Down" Arrows to Set Lower Heater Temperature
   Press and Hold "Program" Button To Finish
Display Actual Temperatures
   Press and Hold "Temperature" Button
   Press "Temperature" Button to Toggle Between Upper and Lower Heaters
   Press any Other Button to Exit Mode
Any Programming Sequence is Aborted if No Button is Pressed with 10 seconds.

The present invention having been thus described with particular reference to preferred embodiments thereof, it will be obvious that various changes may be made therein without departing from the spirit and scope of the present invention as described and claimed herein.

What is claimed is:

1. A food holding cabinet having a heating chamber for holding a covered food tray therein, comprising:
a housing that defines the heating chamber and a heating chamber opening for access to the heating chamber, the heating chamber including a front portion, a rear portion, and at least one tray location for receiving a food tray, and
a pair of rigid support structures mounted to the housing for suspending a tray cover in the heating chamber in a position above the at least one tray location, the pair of support structures including a front support structure positioned adjacent to and extending across the front of the heating chamber opening, such that when a food tray is inserted into the food tray location and under a suspended tray cover, the food tray will engage a bottom portion of the tray cover and lift it upwardly off of the pair of support structures such that the tray cover is supported by the food tray, and such that as the underlying food tray is removed from the heating chamber, the front support structure engages and prevents the tray cover from being removed from the heating chamber along with the food tray, and the support structures resume suspension of the tray cover.

2. The food holding cabinet of claim 1, wherein the pair of support structures are mounted at positions that will suspend a tray cover thereon at a height that is slightly less than the height of the food tray that is to be seated in the tray location.

3. The food holding cabinet of claim 1, the pair of support structures includes a rear support structure that extends across and is fixed to the rear portion of the heating chamber.

4. The food holding cabinet of claim 1, wherein the front support structure is an elongated rigid member having opposed end portions, and the respective opposed end portions are mounted to the housing to either side of the heating chamber opening.

5. The food holding cabinet of claim 1, wherein the front support structure is temporarily movable away from a first position near and across the heating chamber opening where the front support structure supports a tray cover to a second position further away from the first position to facilitate removal of the tray cover from the front support structure and from the heating chamber opening.

6. The food holding cabinet of claim 5, wherein the front support structure is spring-loadedly mounted to the housing such that it is temporarily movable against a biasing force away from the first position to the second position and by the biasing force back toward the first position.

7. The food holding cabinet of claim 5, wherein the front support structure has opposed end portions and a central portion between and communicating with the end portions, at least one opposed end portion having a spring section such that the central portion is movable away from the first position to the second position and back toward the first position.

8. The food holding cabinet of claim 7, wherein each of the opposed end portions has a spring section.

9. The food holding cabinet of claim 4, wherein at least one of the respective opposed end portions of the elongated rigid member is spring-loadedly mounted to the housing to allow the at least one spring-loaded end portion and at least an adjacent portion of the elongated rigid member to be moved against the bias of the spring further away from the housing and heating chamber opening, to facilitate removal of a food tray cover from the support structures and the heating chamber opening.

10. The food holding cabinet of claim 9, wherein each of the respective opposed end portions of the elongated rigid member is spring-loadedly mounted to the housing.

11. The food holding cabinet of claim 3, wherein the front support structure is a bar.

12. The food holding cabinet of claim 11, wherein the bar has a central portion and opposed end portions that are at an angle to the central portion, the housing has a front wall that defines the heating chamber opening, and the respective opposed end portions are spring-mounted to the housing front wall to either side of the heating chamber opening.

13. The food holding cabinet of claim 1, wherein the housing includes a rear wall which in part defines the heating chamber, the rear wall being at least partly removable so as to create a heating chamber rear opening.

14. The food holding cabinet of claim 1, wherein the heating chamber is for holding a plurality of covered food trays therein, wherein the heating chamber includes a plurality of food tray locations, a left tray location, and a right tray location, the left and right tray locations being side-by-side to one another and each for receiving a food tray, the pair of support structures being for suspending a tray cover above each tray location, such that when a food tray is inserted into a respective food tray location and under a respective suspended tray cover, the food tray will engage a bottom portion of its respective tray cover and lift it upwardly off of the pair of support structures such that the tray cover is supported by its underlying food tray, and such that as the underlying food tray is removed from the heating chamber, the front support structure engages and prevents the tray cover from being removed from the heating chamber along with the food tray, and the support structures resume suspension of the tray cover.

15. The food holding cabinet of claim 14, wherein the pair of support structures are mounted at positions that will suspend each of the tray covers thereon at a height that is slightly less than the height of the respective food tray that is to be seated in the respective tray location.

16. The food holding cabinet of claim 14, wherein the heating chamber includes a rear support structure positioned adjacent to and mounted the rear portion of the heating chamber.

17. The food holding cabinet of claim 14, wherein the front support structure is an elongated rigid member having opposed end portions, and the respective opposed end portions each include a spring and are spring-loadedly mounted to the housing to either side of the heating chamber opening.

18. The food holding cabinet of claim 17, wherein the elongated rigid member is a bar.

19. The food holding cabinet of claim 16, wherein the rear support structure is an elongated rigid member that extends across the rear portion of the heating chamber and is fixed to the housing.

20. The food holding cabinet of claim 14, wherein the heating chamber is for holding a plurality of covered food trays therein, wherein the heating chamber includes two compartments, an upper compartment and a lower compartment, one being above the other and separated by a floor, the upper compartment including an upper left tray location and an upper right tray location, and the lower compartment including a lower left tray location and an lower right tray location, side-by-side to one another, each of the four tray locations being for receiving a respective food tray, there being two pairs of support structures, a first upper pair of support structures mounted to the housing to be operative to suspend a food tray cover above each respective upper left and upper right food tray locations, and a second lower pair of support structures mounted to the housing to be operative to suspend a food tray cover above each respective lower left and lower right food tray locations, such that when a food tray is inserted into a respective food tray location and under a respective suspended tray cover, the food tray will engage a bottom portion of its respective tray cover and lift it upwardly off of the corresponding pair of support structures such that the tray cover is supported by its underlying food tray, and such that as the underlying food tray is removed from the heating chamber, the front support structure of the corresponding pair of support structures engages and prevents the tray cover from being removed from the heating chamber along with the removed food tray, and the corresponding pair of support structures resumes suspension of the tray cover.

21. The food holding cabinet of claim 20, wherein each pair of support structures is mounted at positions that will suspend each of the tray covers to be suspended thereon at a height that is slightly less than the height of the respective food tray that is to be seated thereunder in the respective tray location.

22. The food holding cabinet of claim 20, wherein each pair of the two pairs of upper and lower support structures includes a front support structure positioned adjacent to the front portion of the respective upper and lower compartments, and a rear support structure positioned adjacent to the rear portion of the respective upper and lower compartments, each of the respective upper and lower front support structures extending across and in front of the heating chamber opening to the respective upper and lower compartments.

23. The food holding cabinet of claim 22, wherein each front support structure is an elongated rigid member having opposed end portions, at least one of the respective opposed end portions of the elongated rigid member includes a spring and is spring-loadedly mounted to the housing to allow the at least one spring-loaded end portion and at least an adjacent portion of the elongated rigid member to be moved against the bias of the spring further away from the housing and heating chamber opening, to facilitate removal of the food tray from the support structures and the heating chamber opening.

24. The food holding cabinet of claim 23, wherein each of the opposed end portions of the respective front support structures includes a spring and is spring-loadedly mounted to the housing to either side of the heating chamber opening alongside the respective upper and lower compartments.

25. The food holding cabinet of claim 23, wherein the front support structure elongated rigid member is a bar.

26. The food holding cabinet of claim 22, wherein the rear support structure is an elongated rigid member that extends across the rear portion of the heating chamber and is fixed to the housing.

27. The food holding cabinet of claim 20, wherein the housing includes a rear wall which in part defines the heating chamber, the rear wall being at least partly removable so as to create a heating chamber rear opening.

28. The food holding cabinet of claim 22, wherein the front support structure elongated rigid members are mounted to the housing to be temporarily movable away from a first position near the heating chamber opening where the front support structures support one or two tray covers, to a second position further away from the first position, to facilitate removal of either or both of the tray covers from the respective support structures and the heating chamber opening.

29. The food holding cabinet of claim 28, wherein the front support structures are spring-loadedly mounted to the housing such that they are temporarily movable against a biasing force away from the first position to the second position and by the biasing force back toward the first position.

30. The food holding cabinet of claim 28, wherein the front support structure has opposed end portions and a central portion between and communicating with the end portions, at least one opposed end portion having a spring section such that the central portion is movable away from the first position to the second position and back toward the first position.

31. The food holding cabinet of claim 30, wherein each of the opposed end portions has a spring section.

32. A food tray cover for covering a food tray for use in a food holding cabinet, which comprises:
   a recessed top central panel, said central panel being in communication with and being surrounded by
   a pair of opposed upstanding side walls, and by
   a pair of opposed upstanding front and rear walls, said pair of side walls communicating with said pair of front and rear walls, wherein said front wall extends up higher than said rear wall, and said front wall communicates with at least one forwardly extending front extension, and said rear wall communicates with at least one rearwardly extending rear extension.

33. The food tray cover of claim 32, wherein said at least one front extension is a continuous lip.

34. The food tray cover of claim 32, wherein said at least one rear extension is a continuous lip.

35. The food tray cover of claim 32, wherein said at least one front extension is a continuous lip, said at least one rear extension is a continuous lip, and said front continuous lip extends further forward than said rear continuous lip extends rearward.

36. The food tray cover of claim 32, wherein said at least one front extension comprises a plurality of lips.

37. The food tray cover of claim 32, wherein said at least one front extension comprises a plurality of prongs.

38. The food tray cover of claim 32, wherein said central panel is substantially flat.

39. The food tray cover of claim 32, wherein said central panel and said walls are substantially flat and substantially rectilinear.

40. The food tray cover of claim 32, wherein one of said side walls communicates with a skirt that depends from said one side wall to below said recessed central panel.

41. The food tray cover of claim 40, wherein said depending skirt extends along substantially the entire length of said central panel.

42. The food tray cover of claim 35, wherein said front and rear continuous lips have an undersurface that is substantially flat.

43. The food tray cover of claim 33, wherein the food tray cover is a one-piece construction made of metal or plastic.

* * * * *